US008577771B2

(12) United States Patent
Milne et al.

(10) Patent No.: US 8,577,771 B2
(45) Date of Patent: *Nov. 5, 2013

(54) TRANSFORMATION OF A MULTI-LEG SECURITY DEFINITION FOR CALCULATION OF IMPLIED ORDERS IN AN ELECTRONIC TRADING SYSTEM

(71) Applicant: Chicago Mercantile Exchange Inc., Chicago, IL (US)

(72) Inventors: Andrew Milne, Maplewood, NJ (US); Aleksandr Sedlin, Brooklyn, NY (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,875

(22) Filed: Feb. 6, 2013

(65) Prior Publication Data
US 2013/0226762 A1 Aug. 29, 2013

Related U.S. Application Data

(63) Continuation of application No. 13/572,161, filed on Aug. 10, 2012, now Pat. No. 8,392,322, which is a continuation of application No. 12/560,026, filed on Sep. 15, 2009, now Pat. No. 8,266,030.

(51) Int. Cl.
G06Q 40/02 (2012.01)
(52) U.S. Cl.
USPC ............................. 705/35; 705/36 R; 705/37
(58) Field of Classification Search
USPC ........................................... 705/35, 36 R, 37
See application file for complete search history.

(56) References Cited

U.S. PATENT DOCUMENTS

| 4,677,552 A | 6/1987 | Sibley, Jr. |
| 4,903,201 A | 2/1990 | Wagner |
| 4,980,826 A | 12/1990 | Wagner |
| 5,500,812 A | 3/1996 | Saishi et al. |
| 5,787,402 A | 7/1998 | Potter et al. |
| 6,021,397 A | 2/2000 | Jones et al. |
| 6,047,274 A | 4/2000 | Johnson et al. |
| 6,317,727 B1 | 11/2001 | May |
| 6,321,212 B1 | 11/2001 | Lange |

(Continued)

FOREIGN PATENT DOCUMENTS

| EP | 0407026 A2 | 1/1991 |
| EP | 0411748 A2 | 2/1991 |
| JP | 2000/353196 A | 12/2000 |
| JP | 2001/222591 A | 8/2001 |

OTHER PUBLICATIONS

International Preliminary Report on Patentability from related International Application No. PCT/US2010/047075 mailed Mar. 20, 2012.

(Continued)

Primary Examiner — Elda Milef
(74) Attorney, Agent, or Firm — Lempia Summerfield Katz LLC

(57) ABSTRACT

An electronic trading system utilizes a Match Engine that receives orders, stores them internally, calculates tradable combinations and advertises the availability of real and implied orders in the form of market data. New tradable items defined as combinations of other tradable items may be included in the calculation of tradable combinations. A technique is disclosed for transforming a combination or strategy contract with an arbitrary number of buy and sell legs with an arbitrary volume ratio for each leg into a form that can be used for rapid implied order calculations.

29 Claims, 21 Drawing Sheets

(56) References Cited

U.S. PATENT DOCUMENTS

| | | |
|---|---|---|
| 6,347,307 B1 | 2/2002 | Sandhu et al. |
| 6,356,911 B1 | 3/2002 | Shibuya |
| 6,405,180 B2 | 6/2002 | Tifors et al. |
| 6,418,419 B1 | 7/2002 | Nieboer et al. |
| 6,421,653 B1 | 7/2002 | May |
| 6,618,707 B1 | 9/2003 | Gary |
| 6,658,393 B1 | 12/2003 | Basch et al. |
| 6,721,715 B2 | 4/2004 | Nemzow |
| 6,829,589 B1 | 12/2004 | Saliba |
| 6,996,540 B1 | 2/2006 | May |
| 7,039,610 B2 | 5/2006 | Morano et al. |
| 7,043,457 B1 | 5/2006 | Hansen |
| 7,089,206 B2 | 8/2006 | Martin |
| 7,130,789 B2 | 10/2006 | Glodjo et al. |
| 7,177,833 B1 | 2/2007 | Marynowski et al. |
| 7,194,481 B1 | 3/2007 | Van Roon |
| 7,231,363 B1 | 6/2007 | Hughes et al. |
| 7,246,092 B1 | 7/2007 | Peterson et al. |
| 7,280,481 B2 | 10/2007 | Rong |
| 7,299,208 B1 | 11/2007 | Bailon et al. |
| 7,542,937 B1 | 6/2009 | Cohen |
| 7,542,940 B2 | 6/2009 | Burns et al. |
| 7,542,941 B1 | 6/2009 | Cohen |
| 7,548,882 B1 | 6/2009 | Pazner |
| 7,685,052 B2 | 3/2010 | Waelbroeck et al. |
| 2001/0042785 A1 | 11/2001 | Walker et al. |
| 2001/0056398 A1 | 12/2001 | Scheirer |
| 2002/0002530 A1 | 1/2002 | May |
| 2002/0035531 A1 | 3/2002 | Push |
| 2002/0070915 A1 | 6/2002 | Mazza |
| 2002/0077947 A1 | 6/2002 | Ward et al. |
| 2002/0099651 A1 | 7/2002 | May |
| 2002/0116314 A1 | 8/2002 | Spencer et al. |
| 2002/0116317 A1 | 8/2002 | May |
| 2002/0156719 A1 | 10/2002 | Finebaum et al. |
| 2002/0169774 A1 | 11/2002 | Greenbaum et al. |
| 2002/0178102 A1 | 11/2002 | Scheinberg et al. |
| 2002/0194115 A1 | 12/2002 | Nordlicht et al. |
| 2003/0004899 A1 | 1/2003 | Bergenudd |
| 2003/0009419 A1 | 1/2003 | Chavez et al. |
| 2003/0023542 A1 | 1/2003 | Kemp |
| 2003/0033240 A1 | 2/2003 | Balson et al. |
| 2003/0050879 A1 | 3/2003 | Rosen et al. |
| 2003/0093360 A1 | 5/2003 | May |
| 2003/0125982 A1 | 7/2003 | Ginsberg et al. |
| 2003/0200167 A1 | 10/2003 | Kemp, II et al. |
| 2003/0220868 A1 | 11/2003 | May |
| 2003/0229571 A1 | 12/2003 | May |
| 2003/0236737 A1 | 12/2003 | Kemp |
| 2003/0236738 A1 | 12/2003 | Lange et al. |
| 2004/0015430 A1 | 1/2004 | May |
| 2004/0015431 A1 | 1/2004 | May |
| 2004/0039682 A1 | 2/2004 | Sandholm et al. |
| 2004/0049738 A1 | 3/2004 | Thompson et al. |
| 2004/0064395 A1 | 4/2004 | Mintz et al. |
| 2004/0088242 A1 | 5/2004 | Ascher et al. |
| 2004/0093300 A1 | 5/2004 | Burns |
| 2004/0103054 A1 | 5/2004 | Singer |
| 2004/0117302 A1 | 6/2004 | Weichert et al. |
| 2004/0148242 A1 | 7/2004 | Liu |
| 2004/0153391 A1 | 8/2004 | Burns et al. |
| 2004/0153392 A1 | 8/2004 | West et al. |
| 2004/0153393 A1 | 8/2004 | West et al. |
| 2004/0153394 A1 | 8/2004 | West et al. |
| 2004/0172337 A1 | 9/2004 | Spoonhower et al. |
| 2004/0186806 A1 | 9/2004 | Sinclair et al. |
| 2004/0210514 A1 | 10/2004 | Kemp, II et al. |
| 2004/0236662 A1 | 11/2004 | Korhammer et al. |
| 2004/0254804 A1 | 12/2004 | Peterfry et al. |
| 2005/0044027 A1 | 2/2005 | Rodgers et al. |
| 2005/0080703 A1 | 4/2005 | Chiesa et al. |
| 2005/0086152 A1 | 4/2005 | Sweeting |
| 2005/0097026 A1 | 5/2005 | Morano et al. |
| 2005/0097027 A1 | 5/2005 | Kavanaugh |
| 2005/0137964 A1 | 6/2005 | Nordlicht et al. |
| 2005/0171890 A1 | 8/2005 | Daley et al. |
| 2005/0171894 A1 | 8/2005 | Traynor |
| 2005/0187866 A1 | 8/2005 | Lee |
| 2005/0246263 A1 | 11/2005 | Ogg et al. |
| 2005/0283422 A1 | 12/2005 | Myr |
| 2006/0015436 A1 | 1/2006 | Burns et al. |
| 2006/0059064 A1 | 3/2006 | Glinberg et al. |
| 2006/0059065 A1 | 3/2006 | Glinberg |
| 2006/0059066 A1 | 3/2006 | Glinberg |
| 2006/0059067 A1 | 3/2006 | Glinberg |
| 2006/0059068 A1 | 3/2006 | Glinberg |
| 2006/0059069 A1 | 3/2006 | Glinberg |
| 2006/0095363 A1 | 5/2006 | May |
| 2006/0143099 A1 | 6/2006 | Partlow et al. |
| 2006/0149660 A1 | 7/2006 | Morano et al. |
| 2006/0161498 A1 | 7/2006 | Morano et al. |
| 2006/0173761 A1 | 8/2006 | Costakis |
| 2006/0190371 A1 | 8/2006 | Almgren et al. |
| 2006/0190383 A1 | 8/2006 | May |
| 2006/0259406 A1 | 11/2006 | Kemp et al. |
| 2006/0259409 A1 | 11/2006 | Burns et al. |
| 2006/0265296 A1 | 11/2006 | Glinberg |
| 2006/0293998 A1 | 12/2006 | Tilly et al. |
| 2007/0011079 A1 | 1/2007 | May |
| 2007/0100732 A1 | 5/2007 | Ibbotson et al. |
| 2007/0112665 A1 | 5/2007 | Mackey, Jr. et al. |
| 2007/0239591 A1 | 10/2007 | May |
| 2007/0282733 A1 | 12/2007 | May |
| 2008/0077320 A1 | 3/2008 | Loftus et al. |
| 2008/0077521 A1 | 3/2008 | Sibley et al. |
| 2008/0133402 A1 | 6/2008 | Kurian et al. |
| 2008/0154764 A1 | 6/2008 | Levine et al. |
| 2008/0183639 A1 | 7/2008 | Disalvo |
| 2008/0208778 A1 | 8/2008 | Sayyar-Rodsari et al. |
| 2008/0288386 A1 | 11/2008 | Ferris |
| 2008/0288391 A1 | 11/2008 | Downs et al. |
| 2009/0018944 A1 | 1/2009 | DeVerdier |
| 2009/0063365 A1 | 3/2009 | Pinkas |
| 2009/0076982 A1 | 3/2009 | Ginberg et al. |
| 2009/0083175 A1 | 3/2009 | Cushing |
| 2009/0106133 A1 | 4/2009 | Redmayne |
| 2009/0157563 A1 | 6/2009 | Serbin et al. |
| 2009/0228400 A1 | 9/2009 | Burns et al. |
| 2010/0017323 A1 | 1/2010 | Zimmerman |

OTHER PUBLICATIONS

Bolshev, L.N.: "Least Squares, Method of," SpringerLink, Encyclopedia of Mathematics, 2001, pp. 1-7.

Office Action from related U.S. Appl. No. 12/579,118, dated Nov. 14, 2011, 13 pages.

International Search Report dated Dec. 10, 2010 received in related PCT Application No. PCT/US2010/52589.

International Search Report dated Oct. 13, 2010 received in related PCT Application No. PCT/US2010/046591.

International Search Report dated Oct. 13, 2010 received in related PCT Application No. PCT/US2010/047086.

International Search Report dated Oct. 25, 2010 received in related Application No. PCT/US2010/047489.

Augmenting agent negotiation protocols with a dynamic argumentation mechanism, by Ulrich, Thomas W., D.CS., Colorado Technical University, 2003, 253 pages; AAT 3109037.

International Search Report PCT/10/47075, Oct. 14, 2010.

U.S. Appl. No. 10/700,406, filed Nov. 4, 2003. Morano et al.

U.S. Appl. No. 11/368,966, filed Mar. 6, 2006, Morano et al.

U.S. Appl. No. 12/032,379, filed Feb. 15, 2008, Morano et al.

U.S. Appl. No. 12/350,788, filed Jan. 8, 2009, Morano et al.

U.S. Appl. No. 12/553,351, filed Sep. 3, 2009, Milne et al.

U.S. Appl. No. 12/560,122, filed Sep. 15, 2009, Milne et al.

U.S. Appl. No. 12/560,145, filed Sep. 15, 2009, Milne et al.

U.S. Appl. No. 12/579,118, filed Sep. 15, 2009, Milne et al.

PCT/US06/44932 International Search Report Aug. 19, 2008.

PCT/US06/43282 International Search Report May 30, 2008.

PCT/US06/44702 International Search Report Aug. 17, 2007.

PCT/US06/44917 International Search Report Aug. 28, 2007.

PCT/US06/28001 International Search Report May 7, 2007.

PCT/US06/27762 International Search Report Mar. 9, 2007.

(56) References Cited

OTHER PUBLICATIONS

CME® "Clearing Services CME and LCH"; Advisory Notice; http://www.web.archive.org/web/20050300002321/http://www.cme.com/clearing/rmspan/cm/Ich . . . last accessed Feb. 22, 2007; 1 page.

CME® "Clearing Services Layout for Results"; Advisory Notice; http://www.web.archive.org/web/20050308181020/http://www.cme.com/clearing/rmspan/cme/rec . . . , last accessed Feb. 22, 2007, 2 pages.

CME® "Foreign Exchange Products; Trading CME FX Futures: Maximizing the Opportunity for the Individual Investor"; 2005; 6 pages.

CME® "Glossary for Retail FX"; http://www.cme.com/files/FXWebglossary.pdf; 16 pages, 2009.

Position Limit, bjtp://http://www.investopedia.com/terms/positionlimit/asp; 4 pages, 2009.

U.S. Commodity Futures Trading Commission; "Security Futures Products Speculative Position Limits"; http://www.cfte.govlindustryoversight/contractsandproducts/sfpspeculativelimits.html; Jul. 26, 2007; 1 page.

U.S. Commodity Futures Trading Commission; "What's New at the CFTC", http://www.cftc.gov/index.html; Mar. 19, 2009; 2 pages.

U.S. Commodity Futures Trading Commission; "Trading Organizations", http://www.cftc.gov/industrsoversign/tradingorganizations.index.html; Mar. 19, 2009; 1 page.

U.S. Commodity Futures Trading Commission; "Clearing Organizations"; http://www.cftc.gov/industryoversight/clearingorganizations/index/html; Mar. 19, 2009; 2 pages.

HALL "Getting Started in Stocks"; Third Edition; Google Book Search; http://books.google.com/books?id=mA-sSKm B2sC &dg=margin+account+maintenance . . . ; Sep. 26, 2008; pp. 105-114; Coughlan Publishing; 1997.

K. Balasubramanian et al, "Developing Applications Using Model-Driven Design Environments", IEEE Computer, Feb 2006 (vol. 39, No. 2).

K. Chen et al, Towards Formalizing Domain-specific Modeling Languages', Vanderbilt University Institute for Software Integrated Systems, presented at the Object Management Group (OMG) OMG's First Annual Model-Integrated Computing Workshop, 2004.

G. Guizzardi et al, "On the role of Doman Ontologies in the design of Domain-Specific Visual Modeling Languages", Proceedings of the $17^{th}$ ACM Conference on Object-Oriented Programming, Systems, Languages and Applications (OOPSLA 2002), Seattle, USA, 2002, Helsinki School of Economics Printing, Working Paper Series @-334 (ISSN 1235-5674), downloaded from Centre for Telematics and Information Technology, University of Twente, The Netherlands.

G.Guizzardi et al, Ontology-Based Evaluation and Design of Domain-Specific Visual Modeling Languages', Proceedings of the $14^{th}$ International Conference on Information Systems Development, Karlstad, Sweden, 2005.

D. Schmidt, "Model-Driven Engineering", IEEE Computer Feb. 2006; vol. 39, No. 2.

Peake, The National Book System, An Electronically Assisted Auction Market, pp. -02290-pp. -02353 (Apr. 30, 1976).

INTEX, The International Futures Exchange (Bermuda) Limited, Functional Specifications, pp. 01932-pp. 01999 (Aug. 1981).

Blank, John J. "Implied Trading in Energy Futures." The Journal of Trading. vol. 2, No. 3; pp. 45-48; Summer 2007 (3 pages).

| Contract Symbol | Description | Buy Order Node Pair | Sell Order Node Pair |
|---|---|---|---|
| HOF | Heating Oil, January Delivery, Outright | 1,0 | 0,1 |
| HOG | Heating Oil, February Delivery, Outright | 2,0 | 0,2 |
| HOH | Heating Oil, March Delivery, Outright | 3,0 | 0,3 |
| CLF | Crude Oil, January Delivery, Outright | 4,0 | 0,4 |
| CLG | Crude Oil, February Delivery, Outright | 5,0 | 0,5 |
| CLH | Crude Oil, March Delivery, Outright | 6,0 | 0,6 |
| HOF:HOG | Buy Jan Heat, Sell Feb Heat, Calendar Spread | 1,2 | 2,1 |
| HOF:HOH | Buy Jan Heat, Sell Mar Heat, Calendar Spread | 1,3 | 3,1 |
| HOG:HOH | Buy Feb Heat, Sell Mar Heat, Calendar Spread | 2,3 | 3,2 |
| CLF:CLG | Buy Jan Crude, Sell Feb Crude, Calendar Spread | 4,5 | 5,4 |
| CLF:CLH | Buy Jan Crude, Sell Mar Crude, Calendar Spread | 4,6 | 6,4 |
| CLG:CLH | Buy Feb Crude, Sell Mar Crude, Calendar Spread | 5,6 | 6,5 |
| HOF:CLF | Buy Jan Heat, Sell Jan Crude, Intercommodity Spread | 1,4 | 4,1 |
| HOG:CLG | Buy Feb Heat, Sell Feb Crude, Intercommodity Spread | 2,5 | 5,2 |
| HOH:CLH | Buy Mar Heat, Sell Mar Crude, Intercommodity Spread | 3,6 | 6,3 |

FIG. 4

New order expressed in FIX Format with numeric tags. Tag 35 indicates the message type. The value 35=D indicates a new order:

[35=D; 55=CLF10; 54=1; 38=11; 40=2; 44=10000]

901   902   903   904

New order expressed with FIX symbolic tags and free form text:

1001 →
Symbol = CLF10,
Side = Buy,
OrderQty = 11,
OrdType = Limit,
Price=$100.00

TRANSFORMATION OF A MULTI-LEG SECURITY DEFINITION FOR CALCULATION OF IMPLIED ORDERS IN AN ELECTRONIC TRADING SYSTEM

RELATED APPLICATIONS

This application is a continuation application under 37 C.F.R. §1.53(b) of U.S. patent application Ser. No. 13/572,161, filed Aug. 10, 2012, which is a continuation application under 37 C.F.R. §1.53(b) of U.S. patent application Ser. No. 12/560,026, filed Sep. 15, 2009, which are both incorporated herein by reference in their entirety.

This application is related to U.S. patent application Ser. No. 10/700,406, filed Nov. 4, 2003, which is incorporated herein by reference in its entirety.

This application is related to U.S. patent application Ser. No. 11/368,966, filed Mar. 6, 2006, which is a division of U.S. patent application Ser. No. 09/971,172, filed on Oct. 4, 2001, all of which are incorporated herein by reference in its entirety.

This application is related to U.S. patent application Ser. No. 12/032,379, filed Feb. 15, 2008, which is incorporated herein by reference in its entirety.

This application is related to U.S. patent application Ser. No. 12/350,788, filed Jan. 8, 2009, which is incorporated herein by reference in its entirety.

TECHNICAL FIELD

The following disclosure relates to software, systems and methods for electronic trading in a commodities exchange, derivatives exchange or similar business involving tradable items where orders from buyers are matched with orders from sellers.

BACKGROUND

Electronic trading systems allow entry of a bid or offer for a particular tradable item, which in futures trading is referred to as a contract. The simplest possible futures contract is the outright contract defined by a product and a delivery period. It is also possible to define combination contracts, such as a spread contract which is defined as the simultaneous purchase and sale of two or more tradable items, such as futures contracts for different months, different commodities, or different grades of the same commodity. The bid and offer components of a spread are termed the bid leg and the offer leg respectively.

Electronic trading systems accept bids and offers, whether for outright contracts or spreads, in the form of orders, also referred to as real orders because they consist of data entered by traders either directly or by computing devices under their control. An order for an outright contract may be referred to as an "outright order" or simply as an "outright." Real orders may be entered for any tradable item in the system including, but not limited to, futures, options, inter-commodity spreads, intra-commodity spreads, futures strips, calendar spreads, butterfly spreads, condor spreads, crack spreads, straddles, and strangles.

Implied orders, unlike real orders, are generated by the system on the behalf of traders who have entered real orders, generally with the purpose of increasing overall market liquidity. For example, an implied spread order may be derived from two real outright orders. Trading systems identify and create, i.e. calculate, the "derived" or "implied" order and display the market that results from the creation of the implied order as a market that may be traded against. If a trader enters an order to trade against this implied market, then the newly entered order and the real orders that were used to derive the implied market are executed as matched trades.

Implied orders frequently have better prices than the corresponding real orders in the same contract. This can occur when two or more traders incrementally improve their order prices in hope of attracting a trade, since combining the small improvements from two or more real orders can result in a big improvement in their combination. In general, advertising implied orders at better prices will encourage traders to enter the opposing orders to trade with them. The more combinations that the Match Engine of a trading system can calculate, the greater this encouragement will be and the more the exchange will benefit from increased transaction volume.

Generating an implied market is a complex process because of, among other considerations, the large number of potential order combinations upon which implied orders may be based. For example, a single commodity product available in 72 different delivery months will have 72 possible outright contracts, each of which may have a resting buy order or a resting sell order. There are 2556 (=(72*71)/2) potential spread contracts, noting that the buy/sell combination and sell/buy combination of any two outright contracts both correspond to the same spread contract. For a simple implied where two real orders combine to form a third order, there are 5256 (=2*72+2*2556) choices of the order to imply and 71 (=72−1) ways to choose a combination of two orders implying any given third order, leading to 373,156 combinations overall. As the number and complexity of the contracts involved in implication gets larger, the number of possible combinations grows exponentially.

For these reasons, trading systems that derive implied orders are often limited by computing capacity and speed. Conventional trading systems do not have an efficient method of determining all possible or best possible implied markets, especially when the order combinations involve more than a few orders.

An example of a technique for defining implicable contracts and calculating implied orders that can trade in such contracts is given in U.S. patent application Ser. No. 12/032,379, captioned above. An example of a technique for rapidly calculating such implied orders is given in U.S. patent application Ser. No. 12/350,788, captioned above.

BRIEF DESCRIPTION OF THE DRAWINGS

FIG. 3b illustrates exemplary order elements for use with the grid of FIG. 3a.

FIG. 4 is a table that explains the orders that could be represented on the simple contract grid of FIG. 3a.

DETAILED DESCRIPTION

The disclosed embodiments relate to a technique for transforming a combination or strategy contract with an arbitrary number of buy and sell legs with an arbitrary volume ratio for each leg into a form that can be used for rapid implied order calculations, such as the techniques disclosed in U.S. patent application Ser. Nos. 12/032,379 and 12/350,788, captioned above.

The order matching function in an electronic trading system is typically performed by a specialized component referred to as a Match Engine, of which there may be multiple instances. Each Match Engine is a specialized order matching component that receives orders, stores them internally, calculates tradable combinations and advertises the availability of real and implied orders in the form of market data. Traders, in turn, utilize the trading system to respond to the market data by sending additional orders. These additional orders are received by the Match Engine, which then attempts to match them with previously received orders or combinations thereof. The Match Engine executes the possible trades and communicates the results.

The embodiments are illustrated and described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved are readily extended to other protocols and interfaces in a predictable fashion.

Regulated and unregulated exchanges and other electronic trading services make use of electronic trading systems. For example, the following embodiments are applicable to any trading or futures market in the United States or elsewhere in the world, for example, the Chicago Board of Trade (CBOT), the Chicago Mercantile Exchange (CME), the Bolsa de Mercadorias e Futuros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

Figure 1:
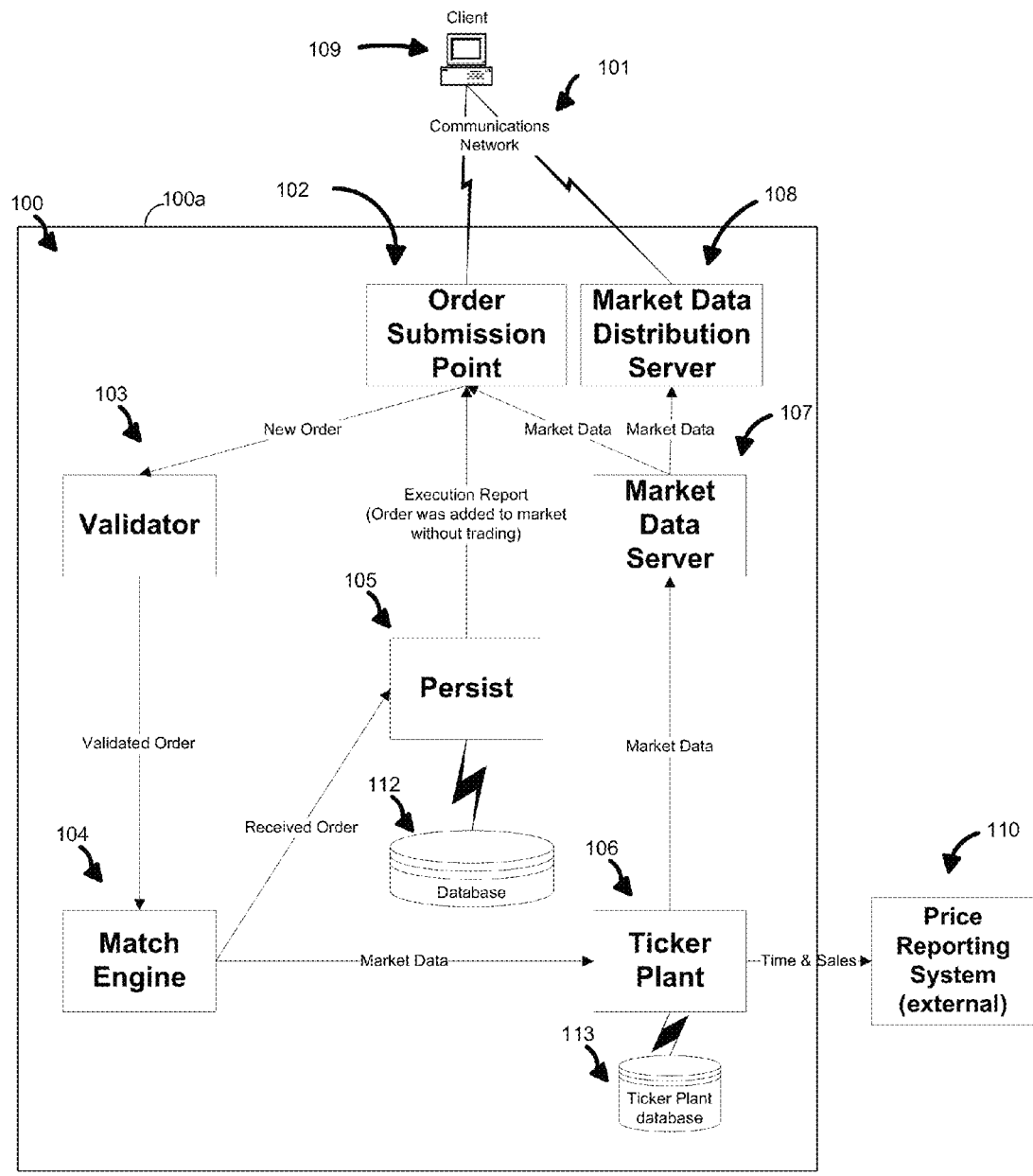
FIG. 1 illustrates an exemplary electronic trading system.

An example of the functional layout of such an electronic trading system 100 is shown in FIG. 1. In this example, the electronic trading system 100 includes the components shown within the system boundary 100a. The client 109 and the price reporting system 110 are shown outside the system boundary 100a but communicate with the electronic trading system 100 using a communications network 101 such as the Internet. The term client is used generically to indicate any user operated device or other networked device capable of communicating with the electronic trading system 100.

In an exemplary implementation, the client 109 transmits electronic orders to an Order Submission Point 102 by way of the communication network 101, such as the Internet. It is contemplated that Order Submission Points 102 may take on a wide variety of application-specific designs to suit the needs of particular brokerages, investors, investment plans and the like. It is also contemplated that the electronic trading system 100 may contain multiple Validators 103, Match Engines 104, Persist components 105, Ticker Plants 106, Market Data Servers 107 and Market Data Distribution Servers 108. The routing of messages between these components 103 to 108 may be managed with commercially available hardware and software. It is understood that descriptions are given in the singular only to simplify the exposition. It is further understood that the term "order" and "new order" may also refer to any data communicated to the trading system that can affect the properties of a previously communicated order, including, but not limited to, modification of its price, modification of its volume or its cancelation or replacement by a different order, or a combination thereof.

The Order Submission Point 102 communicates with the Validator 103. The Validator 103 checks the properties of the new order against established criteria and communicates the validated order to the relevant Match Engine 104, if more than one is provided (not shown). In FIG. 1, it is assumed that the new order did not match any previously entered orders, so the Match Engine 104 communicates the unmatched received order to the Persist component 105, which stores the order, sometimes referred to as a "resting order," in its database 112, the accumulation of related orders in this database 112 sometimes being referred to as an "order book" or a "market." In FIG. 1, it is also assumed that the storage of the order by the Persist component 105 constitutes its "official" reception by the trading system, so the Persist component 105 communicates an execution report to the Order Submission Point 102, from which it is communicated to the originator of the order. The Persist component 105 may be implemented as part (such as software or firmware) of the match engine 104. Alternatively, the Persist component 105 may be a database, a memory or another storage element. Additionally, the Persist component 105 may be computer hardware including a processor and a storage element.

Match Engine 104 also communicates the existence of the new order and any implied orders that it created to the Ticker Plant 106 (reporting device) which in turn, communicates the new order and implied orders to the Market Data Server 107. Ticker Plant 106 (reporting device) occupies this position between the Match Engine 104 and the Market Data Server 107 and functions to aggregate data from multiple sources and communicate with components outside the electronic trading system 100, such as the Price Reporting System 110. Ticker Plant 106 (reporting device) may be implemented as an integrated component of the Match Engine 104. Alternatively, the Ticker Plant 106 may be computer software, firmware, or hardware, that is separate but in communication with the Match Engine 104 (as shown). The Ticker plant 106 may store all or part of the data it receives in Ticker Plant Database 113 coupled therewith. The Market Data Server 107 may communicate market data to the client 109 in a variety of ways. For example, the market data may be sent to the Order Submission Point 102 for communication with the client over the same link as the execution report, or sent to a Market Data Distribution Server 108 that can communicate with any number of clients (not shown).

Those of skill in the art will appreciate that the operations of Match Engine 104 may be performed in more than one part of trading system 100 or in related systems. For example, the calculation of implied orders may be done by traders at their trading stations (not shown) in search of arbitrage opportunities between trading networks or match engines. It is also possible to perform these calculations outside the trading system 100 for the evaluation of possible trading strategies, for instruction, regulation or in the solution of other problems where trading is used as a model.

Figure 2:
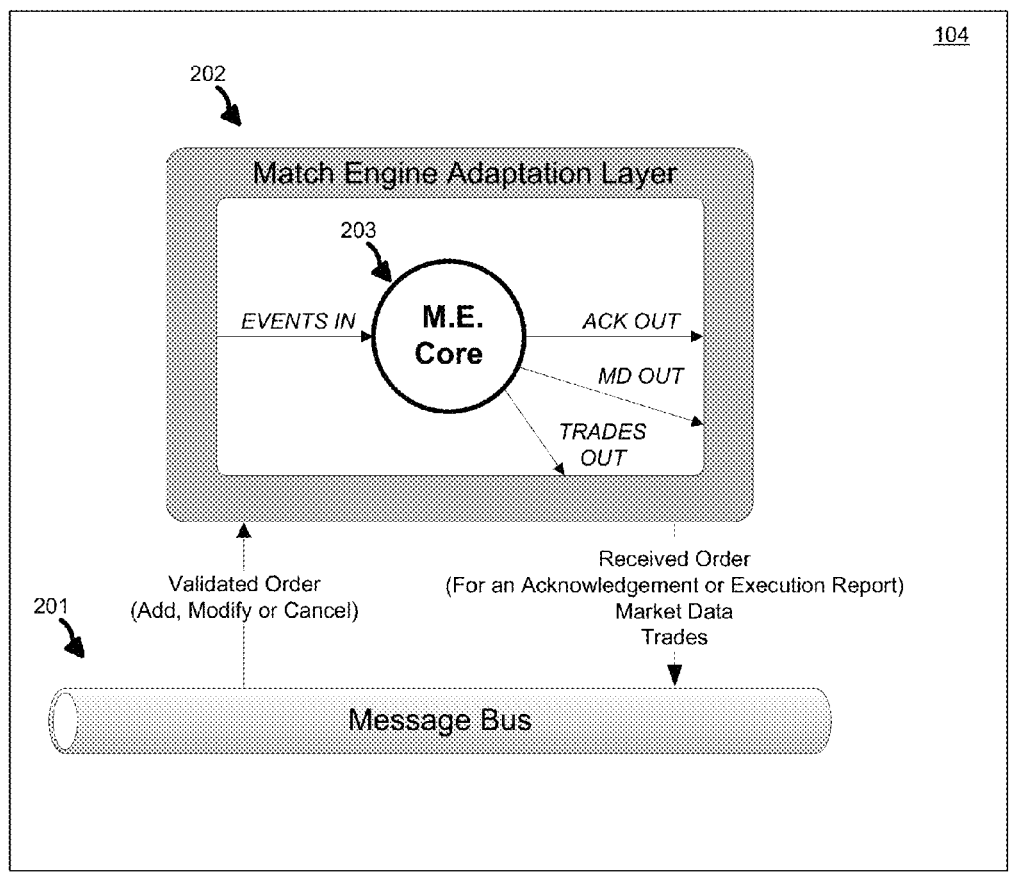
FIG. 2 illustrates an exemplary match engine architecture according to one embodiment.

FIG. 2 shows a more detailed block diagram of the Match Engine 104 of FIG. 1 having a layered architecture and embodied on a computer including a processor and a memory. Match Engine 104 may communicate with other components using a message bus 201. Incoming messages are translated by an Adaptation Layer 202 into events that can be processed by a Match Engine Core 203, sometimes referred to simply as the Core 203. The output messages from the Core 203 are translated by the Adaptation Layer 202 back into messages that can be transmitted to other parts of the trading system 100 using the message bus 201. The Core 203 calculates implied orders and may be implemented in hardware, software or a combination thereof. In one embodiment, the Core 203 is implemented in software which is referred to as the Implicator or Match Engine Implicator (not shown). Although this example includes the Implicator as part of Match Engine 104 in an electronic trading system 100, the Implicator can be used in any system where implied orders need to be calculated. An example of such a system is the client software used by a trader to receive market data and search for arbitrage opportunities on multiple electronic trading systems.

A Match Engine Core 203 and its Implicator may be implemented in a programming language such as Java or C++ that allows multiple threads of execution and that a program with multiple threads may be executed on a computing system with multiple central processing units (CPU). In such an implementation, if the program is correctly designed, the threads may execute substantially in parallel and the time taken to execute all of the threads can be as short as the time taken by the single longest thread. If there are more threads than CPUs, then the execution time will depend on how many threads must be executed sequentially on each CPU. In FIG. 2, it is contemplated that the Core 203 will be implemented in such a language and that the calculation of implied orders by the Implicator will be accelerated by performing many independent calculations in parallel on separate threads.

An Implicator operates on a group of contracts referred to as an implication group. In futures trading, an implication group consists of orders for outright contracts and combination contracts that can trade with each other. An outright contract is defined by at least a product and a delivery period, such as West Texas Intermediate Crude Oil delivered at Cushing, Okla. in the month of January 2008. A combination contract, also referred to as a strategy, may be defined as a combination of orders for outright contracts where each order for an outright contract forms a leg of the strategy. The definition specifies whether buying a unit quantity of the strategy, i.e. the combination contract, requires a given leg to be bought or sold and in what quantity. Strategies may be defined by the exchange and advertised to traders as tradable instruments. Strategies may also be defined by users through a security definition request conveyed to the trading system using an appropriate protocol, as will be described in more detail below.

A simple combination contract found in many futures trading systems is the calendar spread, which is a contract to buy a product in one delivery period and sell it in another. An exemplary implication group would be the outright contracts for a given product in two different delivery periods and the calendar spread contract between these two outright contracts.

It is possible to define combination contracts with any number of legs. Further examples of combination contracts include the intercommodity spread with two legs, the 3:2:1 ratio spread with three legs and the yearly strip with twelve legs. Any number of such contracts may be placed in an implication group so long as any combination contract that belongs to the group also has all of its outright leg contracts as members of the group. It is not necessary for every possible combination of the outright contracts to correspond to a tradable combination contract.

It is possible to define combination contracts where the purchase of a single unit of the combination requires the purchase or sale of any number of units in the legs. The number of units required of any given leg is referred to as its volume ratio. Examples of strategies that include legs having different volume ratios include, but are not limited to, the butterfly, the double butterfly, crack spreads, crush spreads, and other ratio spreads, which are discussed in detail below.

It is possible to extend the foregoing definitions to tradable items other than commodity futures, such as equities, options on equities, options on futures and other tradable instruments.

An exemplary combination contract is the butterfly, which consists of three legs referred to as the wing, the body and the (second) wing. A futures butterfly is typically defined with the wing, the body and the second wing in three successive delivery periods. A futures butterfly definition may be expressed using trading terminology as Buy1exp1 Sell2exp2 Buy1exp3. The double position in the middle is called the body, while the two other positions are called the wings.

The options butterfly, which is a often used as an example because of its common use in volatility trading, is defined with the wing, the body and the second wing as options in the same product and delivery period but with different strike prices. The buy butterfly (long butterfly) call options spread includes a long call at a low strike price, (a long 1 call at (X−a) strike), a long call at a high strike price (long 1 call at (X+a) strike), and a short with twice the unit volume at the average strike price (short 2 calls at X strike). Buy butterfly spreads may also be formed with put options and may also be unbalanced, using different strike prices. A sell butterfly (short butterfly) takes the opposite position.

The double butterfly, also known as the double butterfly spread, is a combination defined as a spread between two simple butterflies, i.e. one butterfly is bought and the other sold. A double butterfly futures spread may be equally defined as a combination of legs at four different delivery periods (expiry dates), which may be expressed as "buy1exp1 sell3exp2 buy3exp3 sell1exp4". For a double butterfly options spread the legs are at four different strike prices instead of different delivery periods.

The crack spread involves a ratio of crude oil to a distillate such as gasoline or heating oil. Simple crack spreads involve only crude oil and a single distillate. However, crack spreads may also be defined in two-one-one, three-two-one, or five-three-two ratios of crude oil and two of its distillates.

A crush spread involves soybeans or other commodity and the products that can be made from the commodity, such as oil from soybeans. A crush spread may be made at any ratio.

The crack spread and crush spread are specific examples of ratio spreads. A ratio spread is any strategy that involves buying some number of tradable instruments and selling a different number of other tradable instruments. The tradable instruments may have some common property and the ratio may be based on some relationship between the physical or financial products that the tradable instruments represent, but this is not required. For example, a ratio spread can be formed using options of the same underlying market (or another market) and (usually) the same expiration date, but of a different strike price. However, this is just an example and ratio spreads may in principle be constructed with any combination of contracts and volume ratios in any number of buy and sell legs.

An example of a technique for defining implicable contracts and calculating the implied orders that can trade in such contracts can be found in U.S. patent application Ser. No. 12/032,379, which is incorporated herein by reference in its entirety. The match engine modeling language (MEML) and implication techniques described therein make use of graph theory, which is the study of mathematical structures used to model pairwise relations between objects from a certain collection. A "graph" in this context refers to a collection of vertices or "nodes" and a collection of "edges" that connect pairs of vertices. The type of graph used in the technique is sometimes referred to more specifically as a "directed graph," since each edge is defined with a source node and a target node, and is directed from the source to the target.

In one implementation, the Match Engine 104 is a computing device operating under the control of a computer program, wherein the computer program implements a specification expressed in the match engine modeling language. As contemplated by U.S. patent application Ser. No. 12/032,379, the modeling language includes a concrete syntax, an abstract syntax for constructing expressions in the language, a syntactic mapping for associating MEML expressions with elements of the trading system 100 and a semantic mapping to relate modeling language expressions to real-world business requirements.

In one implementation, the specification for Match Engine 104 takes the form of sequences of expressions in the modeling language. The engine 104 may be implemented as a finite state machine whose states correspond to model expressions and whose transition rules are expressed in terms of initial states, input events and final states, all of which can be represented in the modeling language. For example, the empty grid shown in FIG. 3a may represent the initial condition of Match Engine 104 after it has been started but before it has received any order data. The placement of a decorated order element, such one of the elements shown in FIG. 3b, adjacent to the grid may indicate that the Match Engine 104 has received the corresponding data at its input. The placement of a decorated order element on the contract grid indicates that the order has rested in the Match Engine Core 203 and can trade with orders that might be received in the future. Other expressions in the modeling language can be used to express the operations required for trading orders and publishing market data. There is an exact correspondence between the concrete syntax of the modeling language (its basic visual elements) and the data entities in the computer program in which the match engine has been implemented. All of the operations that the Match Engine 104 can perform on the data that it has received and stored will correspond with manipulations of the visual symbols in the modeling language and computations with the numerical and alphabetic data in the element decorations and on the grid.

In one implementation, the correspondence between the data formats used by other components of the trading system and the internal formats used by the Match Engine 104 is maintained in the Adaptation Layer 202 using data that the Match Engine 104 obtains from the trading system database at startup. The adaptation layer associates contract identifiers in the external trading system with pairs of nodes in the graph defined by the contract grid in the Match Engine Modeling Language. The Adaptation Layer 202 associates external trading system prices in real world units such as barrels and gallons with machine prices in scaled units that are internal to the Match Engine Core 203 and common to all the contracts in the implication group.

In one implementation, the Adaptation Layer 202 applies a price conversion factor based on whether the order is a buy or a sell. Orders submitted by market participants, such as clients 109, as real orders may be either buys (bids) or sells (asks). The prices of these orders may be positive or negative, but in general a trade is possible when the bid is equal to or better than the asking price. When an order is placed on the contract grid, buys and sells are distinguished by their starting and ending points. The external price of a buy order is multiplied by negative one (−1) and the external price of a sell order is multiplied by positive one (+1) (i.e. no change) to express them as machine prices. As a result, the sum of the machine prices of two or more orders that can trade together will be equal to or less than zero.

In one implementation, an edge corresponds to the best price level on a given side of a contract. The price of the edge extending between the denoted starting and ending points is the price of the best level. The volume of the edge is the total volume of all the orders at the best price level. The time priority of the edge is the time priority of the first order to arrive, also referred to as the front-of-queue order. In addition, weighting factors may be applied to the price, volume and time priority of an edge in order to facilitate the calculation of properties associated with sequences of edges that are connected to form a path. For example, the prices of buy orders may be inverted so that the sum of a buy order price and the price of a sell order that can trade with it will be zero or less.

In one implementation, a path is a sequence of connected edges leading from a starting node to an ending node, and corresponds to a combination of orders in contracts that can be combined to imply an order in the contract associated with the endpoints of the path. The priority of the path relative to other paths or to a real order is determined by its properties and by the priority rule associated with the implied contract, also referred to as a matching algorithm. For example, if the priority rule calls for price-time priority, also referred to as "first-in, first-out" (FIFO), then the price of a path is calculated as the sum of all the weighted edge prices in the path. The path volume is the minimum volume of any of the path's component edges. The path time priority is the maximum time priority number of any of the path's component edges. This is the time priority of the order that "completes" the implied, i.e. the last component order to arrive in the Match Engine. Given these properties, the priority of a path is determined first by the price. If two paths have the same price, then the path with the earliest time priority is "shorter" (i.e. takes precedence) and is considered to be of higher priority. If two paths have the same price and time priority, then the path with the greatest volume takes precedence and is considered to be of higher priority. If all three properties are the same then, in the current implementation, the algorithm selects the first discovered path as being of higher priority. In another implementation, however, additional edge properties could be included in this algorithm for determination of the highest priority path.

It is understood that a price level may consist of multiple real orders arranged in a queue according to their time of arrival, volume, or other properties that determine their priority for trading and that an implied order is simply a path from one node to another whose price, time priority and volume are calculated as from the prices, time priorities and volumes of the component edges. It is further understood that an incoming real order that trades against this implied order will actually trade against several chains of orders that form the same path. Each edge will have a front-of-queue order and the volume of the trade cannot exceed the volume of the smallest front-of-queue order. If the incoming real order is greater in volume than the smallest front-of-queue order but less than the aggregated volume of the path, then successive trades are executed until either the input order or the implied path is eliminated.

An example of a technique for rapidly calculating implied orders is given in U.S. patent application Ser. No. 12/350,788, which is incorporated herein in its entirety. A match engine that implements a specification expressed in the match engine modeling language contemplated by U.S. patent application Ser. No. 12/032,379 may have its speed of calculation increased thereby.

In one implementation, the implied orders for every tradable contract in the implication group may be calculated using a using a collection of shortest path trees. There is a tree rooted at each possible starting node and all of the implied orders originating at this node correspond to paths through the tree to one of its leaves. FIG. 2 illustrates an exemplary implementation wherein, the communication between the Adaptation Layer 202 and Match Engine Core 203 is shown in terms of input events and output responses. Incoming events or orders are categorized into Implicator events depending on the changes they cause to a stored edge. Current implied markets are analyzed to determine which shortest paths will be changed by the changed edge and how much of each path needs to be recalculated. Independent subgroups of implied calculations are allocated to a number of independent threads of execution. Filter criteria may be set to limit the reporting of implied orders to those of the greatest business value and to terminate the calculations as soon as these are found. Criteria may be set for managing the execution of the independent threads on separate processors. The results may be merged into a single message appropriate for translation by the Adaptation Layer 202 for publication as market data to other components of the trading system 100.

Those of skill in the art will appreciate that once a method has been given for expressing a tradable combination of contracts in the match engine modeling language contemplated by U.S. patent application Ser. No. 12/032,379, a match engine specified in that modeling language can be readily extended to perform the computations required to imply any component order in that combination using the techniques associated with finding shortest paths in a graph.

Methods used to accelerate the calculation of implied orders, such as the categorization, analysis, allocation, filtering, thread management and merging techniques contemplated by U.S. patent application Ser. No. 12/350,788 do not depend on the specific form of shortest path calculation so long as there is a means of assigning shortest path trees or similar groups of data to independent threads.

There may be many well-known methods available for calculating shortest paths including, without limitation: Floyd's algorithm, the Bellman-Ford algorithm, Dijkstra's algorithm and Johnson's algorithm. Similarly, the calculation of other graph properties, including but not limited to the identification and removal of zero-priced or negatively-priced cycles within a graph can be performed using straightforward extensions of these algorithms or with other known algorithms.

Figure 3A:
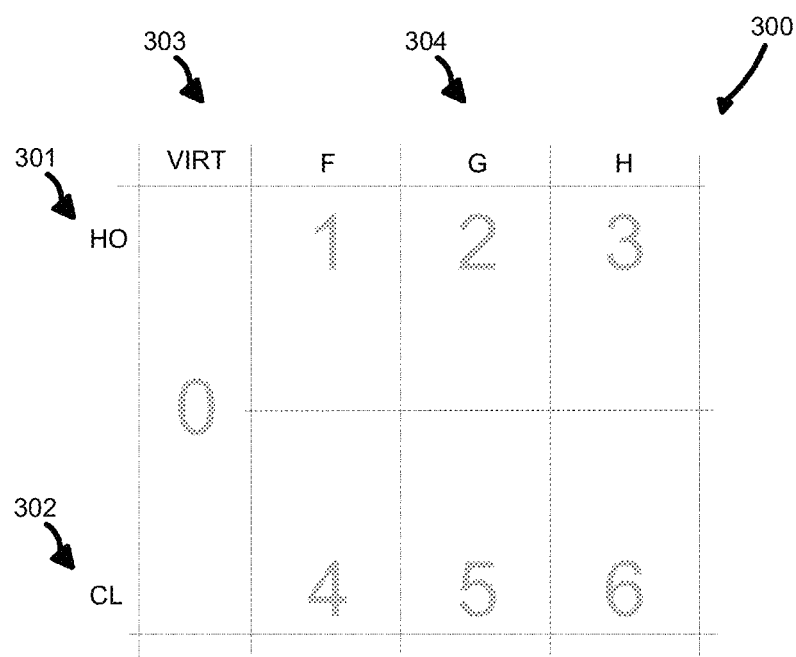
FIG. 3a illustrates a simple contract grid.
Figure 3B:
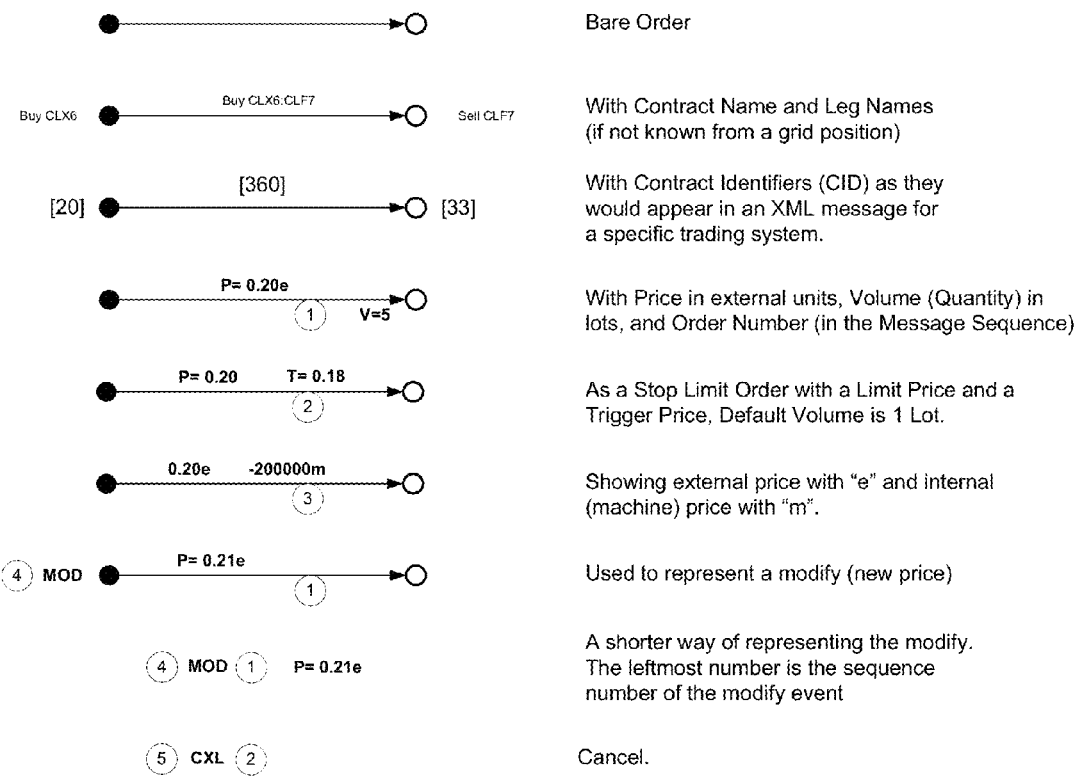

The method for transforming an arbitrary strategy into a form that makes it possible to calculate implied orders using the aforementioned techniques begins with the representation of an implication group in the match engine modeling language, as exemplified in FIG. 3a. The simple contract grid 300 includes contracts in two products, specifically Heating Oil 301 designated by "HO" and West Texas Intermediate Crude Oil 302 designated by "CL". There are three delivery periods 304 designated by the generic months January ("F"), February ("G") and March ("H"). There is also a virtual node 303 as required by the graph theory representation of outright contracts as spread contracts between a virtual contract and an outright contract. In this way, real outright orders may be expressed as edges between the virtual node and the node that corresponds to the product and delivery month that define the outright contract. In some implementations, a directional convention can be included whereby real outright sell orders correspond to the outgoing edges from this node (i.e. buy virtual, sell actual) and the real outright buy orders correspond to the incoming edges (i.e. buy actual, sell virtual). The nodes of grid 300 are numbered from 0 to 6 and the tradable contracts correspond to node pairs.

FIG. 4 is a list of node pairs that can serve as a key to the graph theory representation of FIG. 3a. The node pairs are listed on the right and are matched with the corresponding contract symbol and general description of the contract. The presence of an edge is equivalent to the presence of tradable volume at a price level in the corresponding contract side. To simplify the exposition, the edges will be described as individual orders on the understanding that multiple orders at the same price level may be aggregated to obtain the total tradable volume at that level. Those of skill in the art will appreciate that new orders which can trade with resting orders must often have their volume allocated amongst multiple resting orders according to criteria based on price, volume, time of arrival, trader status and other factors, all of which can be accommodated with the techniques described herein. For example, an edge (not shown) from node 1 to node 4 could correspond to an order to buy Jan. heating oil and sell Jan crude, which is a type of inter-commodity spread that would use the contract symbol HOF:CLF. FIG. 4 lists 30 possible contracts that can be represented on the grid of FIG. 3a, it being understood that the limitation of crack spreads and intercommodity spreads to contracts with a common delivery period is intended as an example of current exchange practice and not an inherent limitation of the technique.

Figure 5:
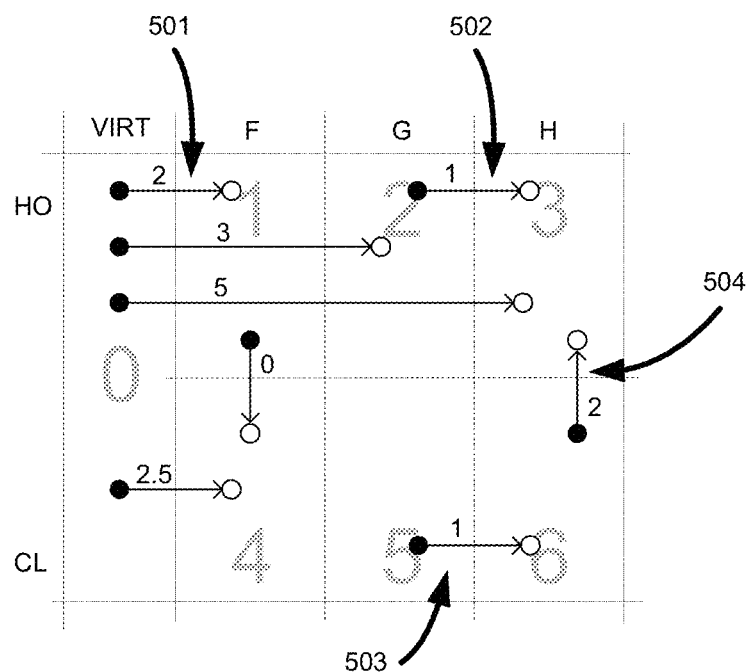
FIG. 5 illustrates the simple contract grid of FIG. 3a including eight exemplary orders.

FIG. 5 illustrates the simple contract grid of FIG. 3a including some exemplary real orders. For example, real order or trading edge 501 represents an outright order to sell heating oil (HO) with a Jan. (F) delivery, edge 502 represents a calendar spread to buy Feb. (G) heating oil and sell Mar. (H) heating oil, edge 503 represents a calendar spread to buy Feb. (G) crude (CL) and sell Mar. (H) crude (CL), and edge 504 represents an inter-commodity spread to buy Mar. (H) crude (CL) and sell Mar. (H) heating oil (HO). Each of these orders are listed in the table of FIG. 4. It is understood that trading system 100 requires much larger grids for its implication groups.

Figure 6:
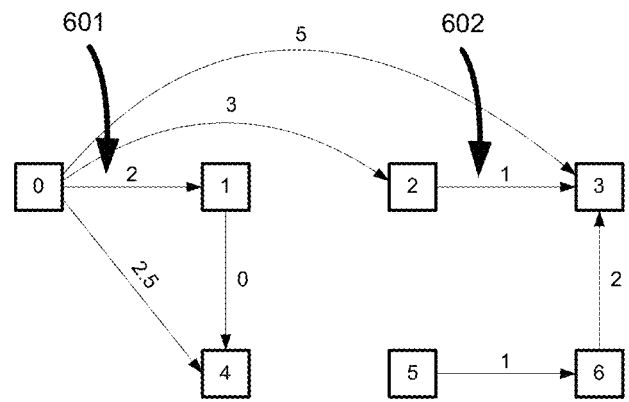
FIG. 6 illustrates an equivalent alternative graphical representation of the eight exemplary orders of FIG. 5 without the details of specific contracts.
Figure 7:
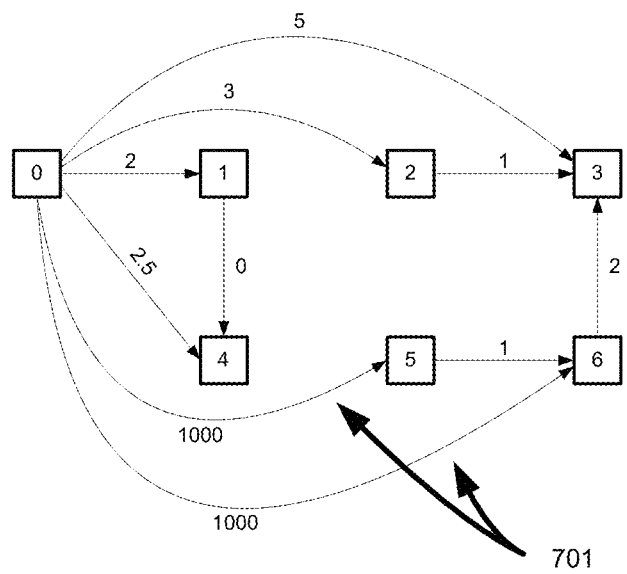
FIG. 7 illustrates the shortest path tree from node zero to all nodes in the contract grid using the alternative graphical representation of FIG. 6.

FIG. 6 shows how the order graph of FIG. 5 can be represented more simply with numbered nodes and weighted edges. Order 501 in FIG. 5 is shown as edge 601 in FIG. 6 and order 502 in FIG. 5 is shown as 602 in FIG. 6. FIG. 7 shows the addition of sentinel-priced orders 701 to assign prices to unreachable nodes. The sentinel prices are defined as real prices that are much greater than any price that would be encountered in practice, such as $10,000,000.00 per barrel for oil. This technique allows absent edges to be identified with a simple price comparison, which is faster in execution and simpler to implement.

Figure 8:
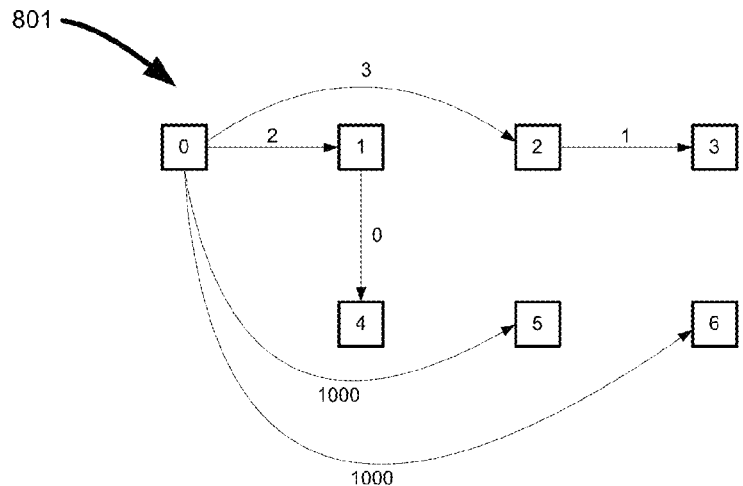
FIG. 8 illustrates the shortest path tree (SPT) as it might be computed by the Bellman-Ford algorithm, along with a numerical representation of the tree structure and the weights of the nodes.

FIG. 8 shows the shortest path tree 801 that would result from the application of the Bellman-Ford algorithm or an equivalent single-root shortest paths algorithm to the graph of FIG. 7. The spt[j] one-dimensional array 802 contains the predecessor of each node in the tree (i.e. node j is preceded by node spt[j]) and the wt[j] one-dimensional array 803 contains the node weights (i.e. wt[j] is the sum of the edge prices between virtual node 0 and node j along the shortest path). It is understood that the sentinel price of 1000 is intended purely for illustration and that in an implementation, the sentinel price would be much greater than any actual price but still within the range of numbers that can be handled by the computing system without causing an overflow.

When the contracts in the implication group are limited to outright contracts and simple 1:1 spreads, then the simple shortest path tree contains all of the data required to calculate implied orders and execute trades with incoming trigger orders. In general, the implied order computed as the path from the root node to a given node in the tree can trade with an incoming trigger order that, if it were added to the graph, would create a zero or negatively priced cycle consisting of the path from the root node to the given tree node plus the trigger order as the edge returning to the root. Expressed differently, the trigger order is only needed at one position in the trade cycle and the implied order computed from the resting orders is exactly the opposite of a hypothetical trigger order that would trade the most volume at the best price.

When the contracts in the implication grid can contain three or more legs or where the legs have different volume ratios, then the simple shortest path tree is not sufficient for calculating the implied volume, since a tradable cycle may require the trigger order to be used at more than one position in the cycle. In an implementation, the Match Engine 104 does not calculate and publish implied orders that require multiple passes through the trigger order prior to receiving the order. When a trigger order arrives however, it is not only compared against the previously calculated implied orders but also checked for tradability in paths where the trigger order itself would require multiple passes. In order to avoid the burden of testing every possible trigger order for the possibility of a multiple pass implied, the Match Engine 104 waits until an actual trigger order has arrived. The Match Engine 104 adds the trigger order to the graph and includes it in the calculations as a "trading edge". It is understood that if the graph does not contain a tradable cycle prior to the addition of the new edge but contains one thereafter, that the cycle must include the new edge. The removal of this cycle through the execution of matched trades in the component edges is a straightforward matter.

In an alternative implementation, the Match Engine 104 considers every possible trigger order and calculates the implied orders that would result if that trigger order were present and available for multiple passes. Those of skill in the art will appreciate that such a Match Engine 104 would be of value for analysis, testing or other applications even if it could not calculate these implied orders at the rate needed for an actual trading system.

In FIG. 1, the client 109 is connected to the order submission point with a communications network 101 and may transmit one or more electronic orders over this network. In an implementation, these orders are represented by messages in the Financial Information eXchange ("FIX") Protocol promulgated by FIX Protocol Limited, located in London, UK. The FIX Protocol has been developed through the collaboration of many parties in the financial industry and provides a common, global language for the automated trading of financial instruments. Those of skill in the art will appreciate that a technique for transforming the data conveyed in FIX messages into data suitable for the rapid computation of implied orders as contemplated by U.S. patent application Ser. No. 12/350,788 will be readily applicable to other formats and protocols as may be used by electronic trading systems now and in the future.

Figures 9, 10:
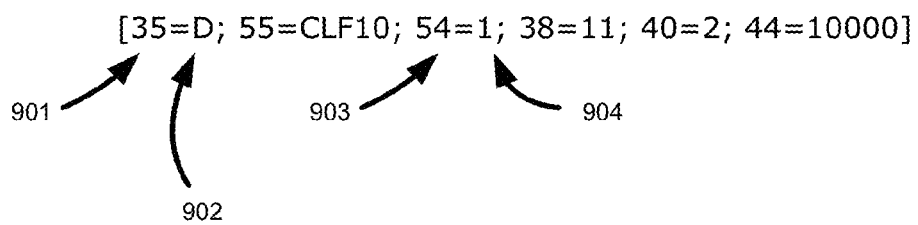
FIG. 9 illustrates an exemplary new order expressed in the Financial Information eXchange (FIX) format with numeric tags.
FIG. 10 illustrates the use of FIX symbolic tags in place of numeric tags.

A FIX message consists of groups of tag-value pairs. A new order message, for example, may have the form shown in FIG. 9. The tag 901 and the value 902 express the association "35=D", which identifies the message as a new order. Those of skill in the art will appreciate that FIX numeric tags are typically referred to by their symbolic names in written exposition on the understanding that the corresponding numeric tags may be used in the actual transmission of data between computing devices. For example, the association "54=1" which identifies an order as a buy order shown by tag 903 and value 904 is more conveniently expressed as "Side=Buy" 1001 in FIG. 10.

In one implementation, every new order message must contain a "tag 48", also referred to as the "SecurityID" (not shown in FIG. 10), whose associated value identifies the item to be bought or sold. Subsequent messages that modify or cancel this order may identify it to the trading system using an order identifier associated with the new order and may not require the SecurityID to be present. The allowable values for SecurityID are made known to the client using a FIX message sequence where the client transmits a Security Definition Request and receives a response. The electronic trading system 100 may store the data needed to send this response in the database 112 used by the Persist component 105 or in some other part of the system (not shown).

In one implementation, the match engine 104 reads the security definition data from the database and creates an association between the tag value pair (SecurityID, Side) and an ordered pair of nodes in the contract grid. This relationship is described as a syntactic mapping in the match engine modeling language because it depends only on the alphanumeric symbols of the SecurityID and the integers used to define Side and the two nodes. In other words, it allows the match engine adaptation layer 202 to transform an expression in the FIX syntax into an expression in the modeling language syntax, specifically an order element from FIG. 3b. A sequence of expressions in the modeling language, if it forms part of the specification of the match engine, will correspond to a sequence of operations on the data stored in the memory of the computing device on which the match engine has been implemented. An example of such a sequence is an empty grid followed by a grid with an order element, which corresponds to the storage of the order data in a structure that corresponds to an edge on the graph.

In one implementation, the construction of the grid from the security definition data takes place in two steps. In the first step, the match engine reads data for the outright contracts and any 1:1 spreads between them. For example, this data may take the form of contract symbols and descriptions similar to those shown in FIG. 4. The engine first creates a virtual node and assigns it the number zero. Then, it reads a list of outright contracts and creates a new node for each of them. The buy and sell sides of the outright contracts receive the node pairs shown in FIG. 4. Then, and still included in the first step, the symbols for the 1:1 spread contracts are read and node pairs assigned based on the buy leg and sell leg of each spread.

In the second step, a list of multi-leg FIX security definitions is read. Those of skill in the art will appreciate that multi-leg strategies may be defined by either by the exchange itself (exchange-defined strategies) or by users via one or more FIX Security Definition Requests (user defined strategies). A method for constructing a grid from FIX security definitions is therefore applicable to strategies from either source. For convenience, the method will be defined in terms of strategies defined entirely with outright legs, it being understood that any strategy defined in terms of spreads or even in terms of other strategies can be expanded into a form where only outright legs are present. It is also understood that the term "security definition request" and "security definition" will be used interchangeably, since a successfully executed request will result in a response that contains a security definition identical in all respects to the request, with the possible exception that the SecurityID is assigned by the trading system instead of by the user.

TABLE 1 and TABLE 2, below, illustrate how the data needed to form a FIX security definition can be stored in a database table. Those of skill in the art will appreciate that a FIX Security Definition is a sequence of characters where a set of component or leg definitions can be associated with their parent security by virtue of their position in the message, but that a database table must express this relationship differently, for example by using the SecurityID as a primary key in the parent table and as a foreign key in the component table. The conversion from a database table representation to a message representation will be readily apparent. It is understood that TABLE 1 and TABLE 2 show only the FIX tags needed to illustrate the technique of the present invention.

TABLE 1

SECURITY_DEFINITION_REQUEST

| Tag | Column Name = FIX Tag Name | Type | Description |
|---|---|---|---|
| 48 | SecurityID | int | Identifies the tradable item. In the table this is an integer key used to associate the component block with the main body of the message. FIX allows the identifier to be alphanumeric. |
| 55 | Symbol | string | e.g. "CLF0" to indicate the January 2010 Crude Oil future |
| 228 | Factor | fixed point decimal 6 digits of precision | FIX 5.0 defines this for derivatives as a Contract Value Factor by which price must be adjusted to determine the true nominal value of one futures/options contract. (Qty * Price) * Factor = Nominal Value May be used to scale up a strip price from the average leg price to the total value of the contract (avg. × # legs). Otherwise Factor = 1. |
| 107 | SecurityDesc | string | e.g. "Crude Oil". Supplements the symbol in displays, especially for less common contracts where the symbols are not so well known. |
| 555 | NoLegs | int | FIX 5.0 makes this optional since it can be deduced by the number of repeating groups in the message (or the number of selected rows in the component table). However, it appears frequently as a consistency check. |
| 969 | MinPriceIncrement | fixed | From the FIX 5.0 spec: Minimum price increment for the instrument. Also referred to as the "tick". |
| 996 | UnitofMeasure | string | From the FIX 5.0 spec: Used to indicate the size of the underlying commodity on which the contract is based (e.g., 2500 lbs of lean cattle, 1000 barrels of crude oil, 1000 bushels of corn, etc.). The match engine may scale volumes when legs have different units of measure. |

TABLE 2

SECURITY_DEFINITION_REQUEST_COMPONENT

| Tag | Column Name = FIX Tag Name | FIX Type | Description |
|---|---|---|---|
| none | SecurityID | int | In the table, associates the block with its parent message. Not present in the FIX message. |
| 602 | LegSecurityID | int | The SecurityID for the leg contract. The entry in the parent table for a single leg contract contains the data on tick size and unit of measure which the match engine needs to scale prices and volumes to a common unit for calculating the prices and volumes of tradable combinations, i.e. implieds. |
| 623 | Leg RatioQty | int/null | Usually an integer. For option plus future combinations such as covered calls, may be set to null. If so, the leg quantity will be calculated using non-null legs to make the order delta-neutral. |
| 624 | LegSide | int | 1 = buy, 2 = sell. The leg sides correspond to the buy order, e.g. a strip has all of its leg sides = 1; a butterfly has buys in the wings and sells in the body |

The method for transforming an arbitrary combination or strategy contract into a form suitable for implied order calculations using the techniques contemplated by U.S. patent application Ser. No. 12/032,379 and U.S. patent application Ser. No. 12/350,788 is described first for the butterfly, a combination contract with three legs and a simple transformation into a single minimal form. The method is presented in general terms and subsequently applied to three additional examples with more complex transformations.

Figure 11:
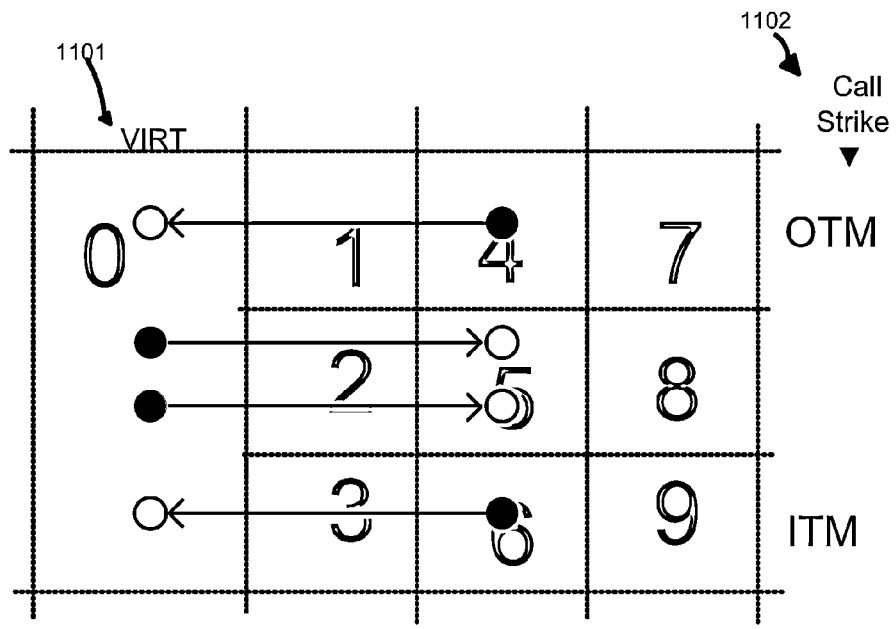
FIG. 11 illustrates a simple contract grid for call options with the outright orders corresponding to the legs of a butterfly in maximal form.

The transformation for the butterfly is illustrated in a series of figures beginning with FIG. 11. Contract grid 1101, shown in FIG. 11, is similar to the contract grid 300 shown in FIG. 3a, except that in FIG. 3a the horizontal rows represent different products whereas in FIG. 11 the horizontal rows represent different strike prices defined for call options on futures in a single product which has not been specified. In both FIG. 3a and FIG. 11 the vertical columns represent different delivery periods. It is understood that the expiry date of the option on the future is associated with the expiry date of the future itself and therefore with the delivery period of the future. In order to simplify the exposition, the strike prices are identified generically as OTM (out of the money) and ITM (in the money) on the understanding that the middle row is at the money (ATM).

The example shown in FIG. 11 is a call butterfly. To take a long position in the call butterfly, the trader buys the wings and sells the body. In this example, the buy orders make up the wings and the sell orders make up the body. Contract grid 1101 includes the four outright orders associated with the long call butterfly. A first buy order drawn as an edge from node 4 to virtual node 0, a second buy order drawn as an edge from node 6 to virtual node 0, a first sell order drawn as an edge from virtual node 0 to node 5, and a second sell order drawn as an edge from virtual node 0 to node 5. The two legs drawn from node 0 to node 5 are both unit volume. This is a visual convenience used to illustrate the transformation method. In an implementation the volume ratio is stored as an integer along with the other data used to represent an edge from node 0 to node 5.

The representation shown in FIG. 11 is referred to as a maximal form. Every strategy definition has a maximal form, and the maximal form of each individual strategy is unique. The maximal form of a strategy expresses the orders as a collection of unit volume buy and sell outright contracts. In other words, as shown in the example of the call butterfly of FIG. 11, each strategy is converted to its outright legs and the volume ratios are converted to multiple legs of unit volume.

Figure 12:
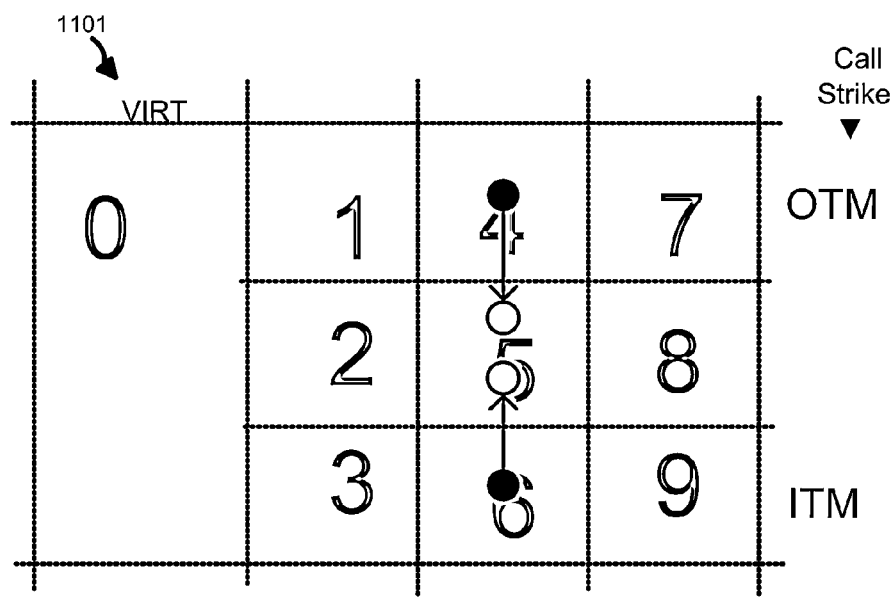
FIG. 12 illustrates the contract grid of FIG. 11 with the butterfly orders shown in the contracts associated with the butterfly's minimal form.

In order for the Match Engine 104 to compute the tradable combinations for a strategy, the maximal form must be transformed into a collection of one or more minimal forms, where each minimal form is a collection of 1:1 spreads with integer volumes. It is understood that the term "spread" in this context includes the orders for outright contracts represented as spread orders to or from the virtual node and, where appropriate, the edges representing orders in these contracts. For example, the call options butterfly whose maximal form is shown in FIG. 11 has the minimal form shown in FIG. 12. Contract grid 1101 is the same in both FIG. 11 and FIG. 12. The first spread order, drawn as an edge from node 4 to node 5, is a combination of the first buy order drawn as an edge from node 4 to virtual node 0 in FIG. 11 and the first sell order drawn as an edge from virtual node 0 to node 5 in FIG. 11. The second spread order, drawn from node 6 to node 5, is a combination of the second buy order drawn as an edge from node 6 to virtual node 0 in FIG. 11 and the second sell order drawn as an edge from virtual node 0 to node 5. In other words, each solid circle (the buy end of an outright order) has been paired with an open circle (the sell end of an outright order), a process which is visually clearer when the body of the butterfly is shown as two unit volume orders in parallel. The symmetry of the butterfly limits the possible pairings and in fact there is only one way represent a butterfly with two spreads. The butterfly has only one minimal form.

In the foregoing discussion, the buy and sell orders placed on the grid were only connected in the business sense that all of them would have to be executed in order for the trader to buy the call butterfly. However, in a Match Engine 104 with full implication, these orders must be linked together so that collectively they imply a buy order in the call butterfly where the call butterfly has been defined as a tradable instrument in its own right. The implied buy call butterfly can be published in the market data and the implied buy order can trade with an appropriately priced sell order if and when such an order is entered by a trader.

Figure 13:
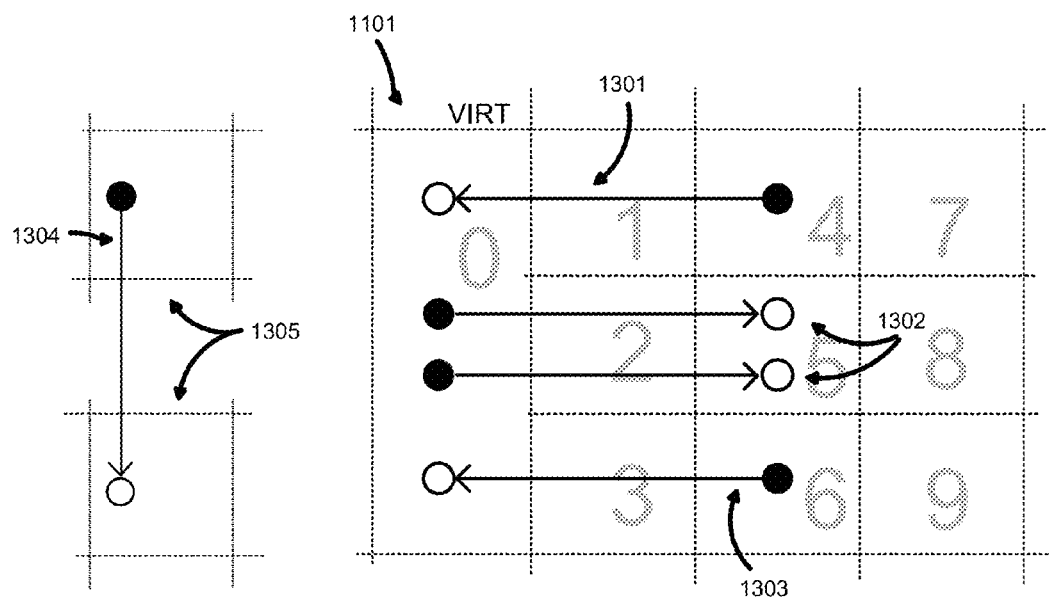
FIG. 13 illustrates the creation of a node pair in constructing the nodes and edges representation for a butterfly.
Figure 14:
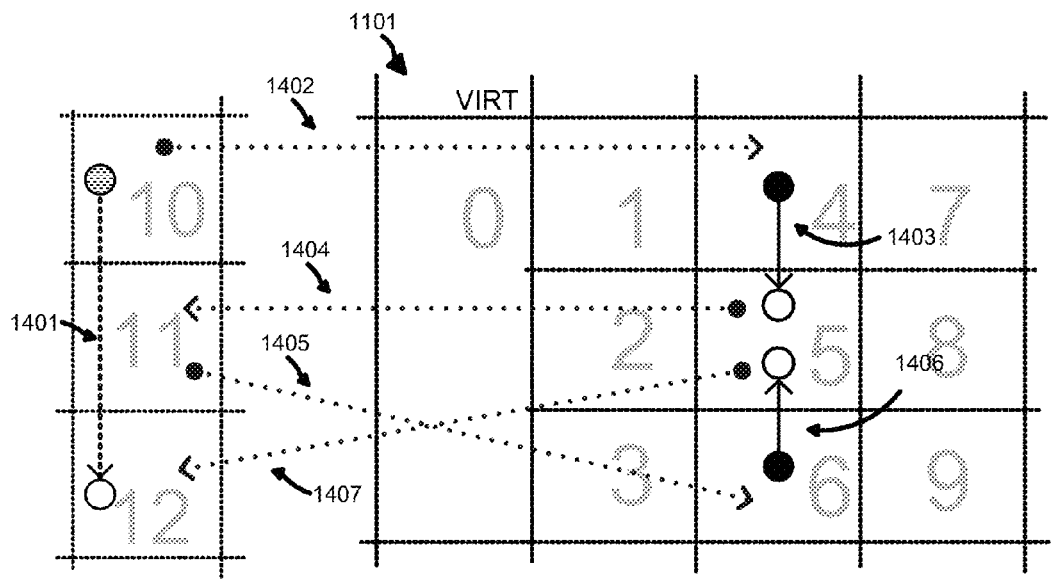
FIG. 14 illustrates the placement of buy helper orders in constructing the nodes and edges representation for a butterfly.

FIG. 13 and FIG. 14 illustrate the technique used in the Match Engine Modeling Language to impose the linkage expressed in the exemplary FIX security definition of TABLE 3 and TABLE 4. The tradable item is the "Butterfly Example" designated by symbol "BFX" and identified to the trading system with SecurityID=1304, corresponding to the buy order element 1304 in FIG. 13. Those of skill in the art will appreciate that the definition of a new tradable item may be expressed as the combination of contracts and sides associated with buying the new item and that this convention has been followed here. The parent table (TABLE 3) shows SecurityID 1304 with three legs and the component table (TABLE 4) contains three rows with the corresponding value of 1304 for SecurityID. These legs are the top wing 1301, the body 1302 and the bottom wing 1303.

TABLE 3

SECURITY_DEFINITION_REQUEST

| SecurityID | Symbol | Factor | SecurityDesc | NoLegs | MinPrice Increment | Unit of Measure |
|---|---|---|---|---|---|---|
| 1304 | BFX | 1 | Butterfly Example | 3 | 0.0001 | 10000 mmBtu |

TABLE 4

SECURITY_DEFINITION_REQUEST_COMPONENT

| SecurityID | LegSecurityID | LegRatioQty | LegSide (1 = BUY, 2 = SELL) |
|---|---|---|---|
| 1304 | 1301 | 1 | 1 |
| 1304 | 1302 | 2 | 2 |
| 1304 | 1303 | 1 | 1 |

LegSecurityID 1301 corresponds to the edge 1301 from node 4 to node 0. LegSecurityID 1302 corresponds to the two edges 1302 from node 0 to node 5. As previously mentioned, the two edges of unit volume are shown in place of the usual single edge with a volume of two for reasons that will be apparent when the procedure is described. LegSecurityID 1303 corresponds to the edge 1303 from node 6 to node 0. In an implementation, the FIX security definition is always expressed in maximal form. In other words, it contains only outright contracts with integer factors for the legs.

There are five steps in transforming a new security definition request into the form contemplated by U.S. patent application Ser. No. 12/032,379 and U.S. patent application Ser. No. 12/350,788, said form consisting of a set of new nodes and associated helper orders added to the contract grid so that orders to buy and sell the new security may be represented as edges between two nodes and for said edges to be used in the calculation of shortest paths or tradable cycles.

The first step is to create the two nodes needed to express the buy and sell orders as edges. For the butterfly in FIG. 13, the match engine creates two new nodes 1305. These will ultimately become node 10 and node 12 in FIG. 14 when the buy side of the construction is complete.

The second step is to transform orders for the set of outright contracts specified in the security definition into a set of spread orders according to the following procedure. Visually, one can imagine expressing the security definition using outright orders in each of the contracts, i.e. in its previously defined "maximal form", then removing the arrows and the circles in the virtual node, leaving a number of open and closed circles on the non-zero numbered nodes of the grid. Then the solid and open circles are connected with arrows to form a collection of spread orders. If there is a circle left over, an outright order to or from zero is added to the collection. Each of these collections is a minimal form for the strategy and there may be several of these, since any of the solid circles may be chosen as the starting point for the first spread order. Each of the spread orders in a minimal form corresponds to a spread combination contract where the outright contract corresponding to the solid circle is bought and the outright contract corresponding to the open circle is sold.

The visual procedure may be expressed algorithmically using the grid 1101 of FIG. 13 as an example. First, identify the lowest numbered starting node of the set of outright contracts other than node 0, which for the outright contracts shown in the example will be node 4. Next, identify the lowest numbered ending node of the set of outright contracts other than node 0, which for the outright contracts shown in the example will be node 5. Make this the first element of the first collection of spreads, remove the starting and ending points from the set of outright contracts and repeat the procedure with the next lowest starting point. Specifically, continue to the next lowest starting number and repeat the process. In the example shown, the pair (4,5) is found on the first step and the (6,5) spread is found on the second step. The set {(4,5), (6,5)} is a minimal form.

When a minimal form has been found, the search continues for additional minimal forms. However, instead of starting with the lowest possible starting point, this node is marked as "used" and the search starts from the next lowest node. In the case of the butterfly shown, the next search would begin with node 6 and identify (6,5) as the first tradable spread, after which (4,5) is the only remaining possibility. This step of the search would end with the set {(6,5), (4,5)}. The search for forms also ends at this point since all of the possible combinations have been enumerated. However, the set {(4,5), (6,5)} and the set {(6,5), (4,5)} are identical from the standpoint of implication because the functional requirement for trading is that all of the component legs have orders present, not that the orders in the legs be executed in any specific sequence. The first found set {(4,5), (6,5)} is sufficient to represent the single minimal form associated with the butterfly.

Figure 26:
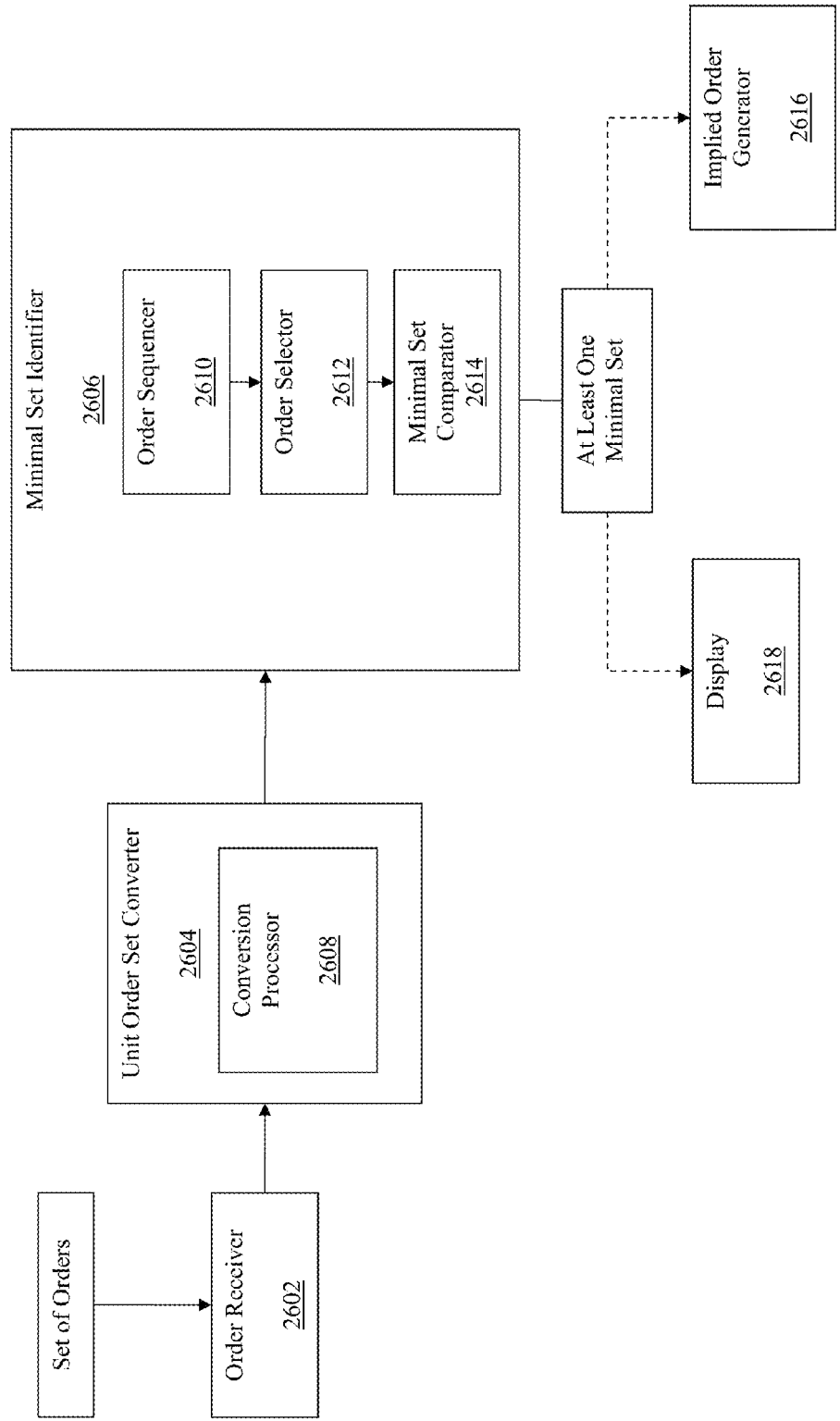
FIG. 26 depicts a block diagram of one embodiment of a system for transforming a set of orders into one or more minimal forms.

FIG. 26 depicts a block diagram of one embodiment of a system 2600 for transforming a set of orders comprising at least one buy order and at least one sell order, each being for a quantity of one or more units of an item tradeable on an exchange, into at least one minimal set, i.e. minimal form, of at least one order subset, each order subset comprising a unit volume spread order, e.g. one buy order for one unit and one sell order for one unit. The system 2600 includes an order receiver 2602, a unit order set converter 2604 coupled with the order receiver 2602 and a minimal set identifier 2606 coupled with the unit order set converter 2604. Herein, the phrase "coupled with" is defined to mean directly connected to or indirectly connected through one or more intermediate components. Such intermediate components may include both hardware and software based components.

The order receiver 2602, unit order set converter 2604 and minimal set identifier 2606 may be implemented in hardware, software, such as logic stored in a memory and executable by a processor, or a combination thereof, as further described below. Further, each of the order receiver 2602, unit order set converter 2604 and minimal set identifier 2606 may be implemented as one or more components or may be otherwise combined into one or more components.

As was described above, the tradeable item may be characterized by a price, a quantity, a delivery month or combinations thereof, and may include a futures contract, an order to buy a futures contract, an order to sell a futures contract, a combination contract, or a combination thereof. The set of orders comprises a combination contract or a strategy, such as a butterfly or a condor, or other strategy described herein or combination thereof, each of the at least one buy order and at least one sell order comprising a leg of the strategy. The set of orders may be specified using the FIX protocol, including but not limited to their specification indirectly through the FIX security definition request, as was described above. The set of orders may be in a maximal form.

The order receiver 2602, which may include a suitable network interface (not shown), is operative to receive the set of orders, such as in the FIX protocol format, as described above, e.g. via a network (not shown).

The unit order set converter 2604 is operative to convert the set of orders into a unit order set comprising separate buy and sell orders for each unit of the respective quantity of the corresponding at least one buy order and at least one sell order of the set of orders.

In one embodiment, the unit order set 2604 converter further includes a conversion processor 2608, as a component thereof or as a separate component therefrom implemented in hardware, software or a combination thereof, operative, for each of the at least one buy order of the set of orders for a quantity of more than one unit, to convert the at least one buy order into a separate buy order for each unit of the quantity, the unit order set comprising the remaining of the at least one buy order of the set of orders for a quantity of only one unit and the separate buy orders. The conversion processor 2608 is further operative, for each of the at least one sell order of the set of orders for a quantity of more than one unit, to convert the at least one sell order into a separate sell order for each unit of the quantity, the unit order set further comprising the remaining of the at least one sell orders of the set of orders for a quantity of only one unit and the separate sell orders.

The minimal set identifier 2606 is operative to identify each of the at least one minimal set as a unique set of order subsets of the unit order set.

In one embodiment, the minimal set identifier 2606 further includes an order sequencer 2610, an order selector 2612 coupled with the order sequencer 2610 and minimal set comparator 2614 coupled with the order selector 2612, each of which may be a part of the minimal set identifier 2606 or a separate component implemented in hardware, software or a combination thereof. The order sequencer 2610 is operative to order the sell orders of the unit order set in a first sequence. The order selector 2612 is operative to select, one at a time, each of the buy orders of the buy orders in the unit order set, order the buy orders of the unit order set in a second sequence beginning with the selected buy order, and, for one of the at least one minimal set for which order subsets have not yet been generated, generate, for each buy order in order of the second sequence for which an order subset of the one of the at least one minimal set does not already include a pairing thereof, an order subset comprising a pairing of the buy order with an unpaired sell order in order of the first sequence, and wherein for each remaining unpaired buy order, generate an order subset comprising a pairing thereof with a virtual sell order and for each remaining unpaired sell order, generate an order subset comprising a pairing thereof with a virtual buy order. The minimal set comparator 2614 is operative to compare each of the at least one minimal sets to another of the at least one minimal set and remove the other of the at least one minimal set if the other of the at least one minimal set is substantially equivalent thereto, each of the remaining at least one minimal set being unique.

In one embodiment, for the purpose of determining equivalence among minimal order sets, separate buy orders converted from one of the at least one buy order are considered equivalent to each other, separate sell orders converted from one of the at least one sell order are considered equivalent to each other, virtual sell orders are considered equivalent to each other and virtual buy orders are considered equivalent to each other.

The system may further include an implied order generator 2616, described elsewhere herein, coupled with the minimal set comparator 2606 and operative to compute at least one implied order based on at least one of the at least one minimal set.

The system may further include a display 2618 coupled with the minimal set comparator 2606 which is operative to represent each of the at least one minimal set as a graph having edges and nodes defined by the order subsets thereof.

Figure 27A:
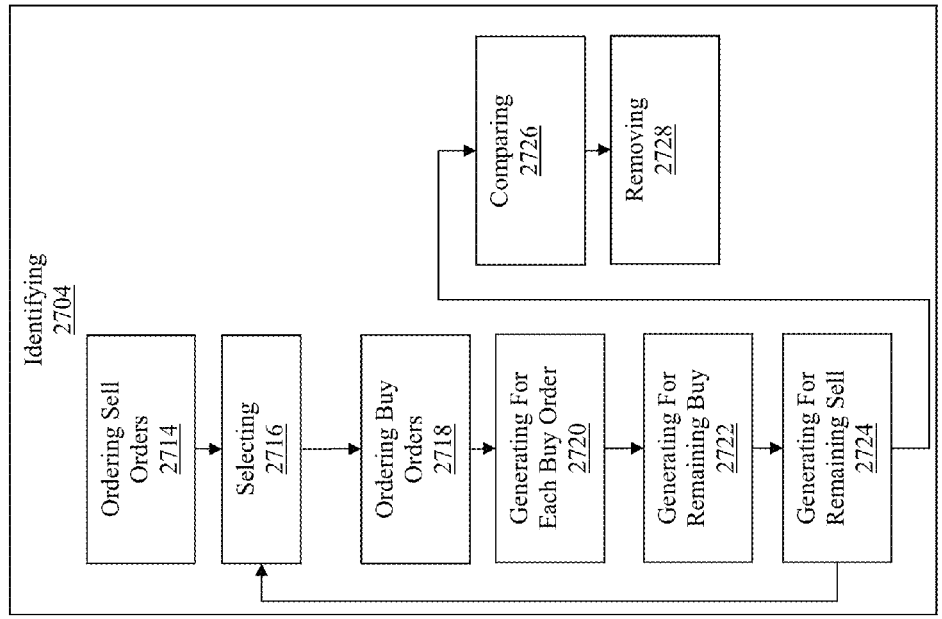
FIGS. 27A-C depict flow charts showing the operation of the system of FIG. 26 according to one embodiment.
Figure 27B:
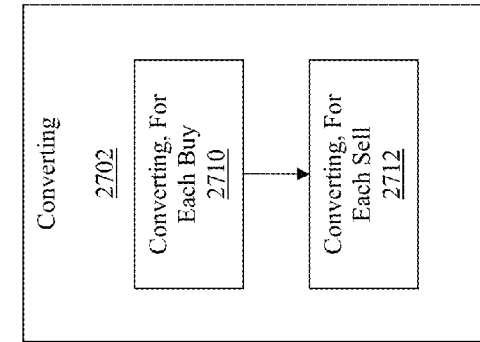
Figure 27C:
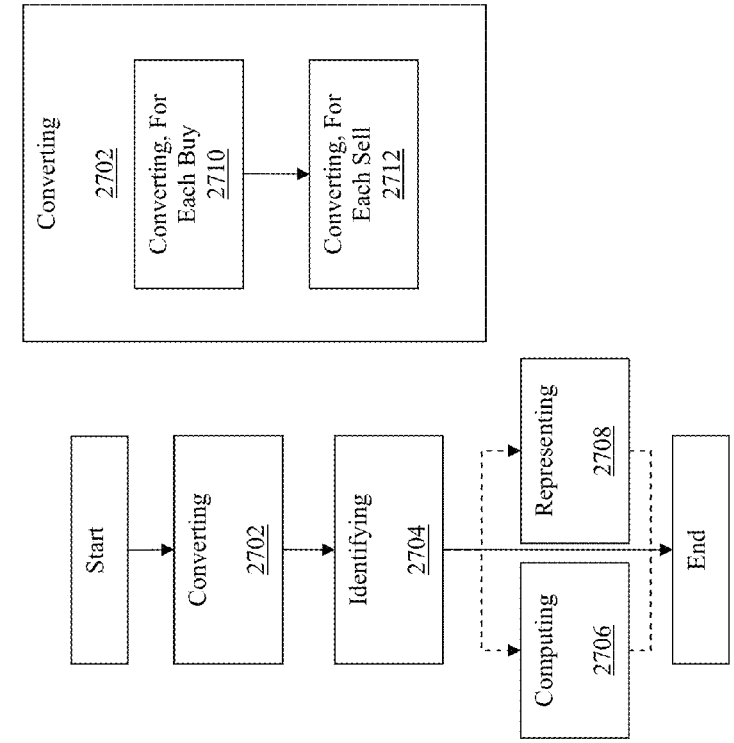

FIGS. 27A-C depicts flow charts showing the operation of the system of FIG. 26. In operation, the operation of the system 2600 of FIG. 26, as shown in FIG. 27A, may include transforming a set of orders comprising at least one buy order and at least one sell order, each being for a quantity of one or more units of an item tradeable on an exchange, into at least one minimal set of at least one order subset, each order subset comprising one buy order for one unit and one sell order for one unit.

As was described above, the tradeable item may be characterized by a price, a quantity, a delivery month or combinations thereof, and may include a futures contract, an order to buy a futures contract, an order to sell a futures contract, a combination contract, or a combination thereof. The set of orders may be specified in the FIX protocol format, including but not limited to their specification indirectly through the FIX security definition request, and may comprise a combination contract or a strategy, such as a butterfly or a condor, or other strategy described herein or combination thereof, each of the at least one buy order and at least one sell order comprising a leg of the strategy. The set of orders may be specified using the FIX protocol as was described above. The set of orders may be in a maximal form.

In one embodiment, the operation includes converting the set of orders into a unit order set comprising separate buy and sell orders for each unit of the respective quantity of the corresponding at least one buy order and at least one sell order of the set of orders (block 2702) and identifying each of the at least one minimal set as a unique set of order subsets of the unit order set (block 2704).

In one embodiment, shown in FIG. 27B, the converting (block 2702) may further include, for each of the at least one buy order of the set of orders for a quantity of more than one unit, converting the at least one buy order into a separate buy order for each unit of the quantity, the unit order set comprising the remaining of the at least one buy order of the set of orders for a quantity of only one unit and the separate buy orders (block 2710) and, for each of the at least one sell order of the set of orders for a quantity of more than one unit, converting the at least one sell order into a separate sell order for each unit of the quantity, the unit order set further comprising the remaining of the at least one sell orders of the set of orders for a quantity of only one unit and the separate sell orders (block 2712).

In one embodiment, as shown in FIG. 27C, the identifying (block 2704) may further include: ordering the sell orders of the unit order set in a first sequence (block 2714); selecting, one at a time, each of the buy orders of the buy orders in the unit order set (block 2716), ordering the buy orders of the unit order set in a second sequence beginning with the selected buy order, and, for one of the at least one minimal set for which order subsets have not yet been generated (block 2718), generating, for each buy order in order of the second sequence for which an order subset of the one of the at least one minimal set does not already include a pairing thereof, an order subset comprising a pairing of the buy order with an unpaired sell order in order of the first sequence (block 2720), and wherein for each remaining unpaired buy order, generating an order subset comprising a pairing thereof with a virtual sell order (block 2722) and for each remaining unpaired sell order, generating an order subset comprising a pairing thereof with a virtual buy order (block 2724); and comparing each of the at least one minimal sets to another of the at least one minimal set (block 2726) and removing the other of the at least one minimal set if the other of the at least one minimal set is substantially equivalent thereto (block 2728), each of the remaining at least one minimal set being unique.

In one embodiment, for the purpose of determining equivalence among minimal order sets, separate buy orders converted from one of the at least one buy order are considered equivalent to each other, separate sell orders converted from one of the at least one sell order are considered equivalent to each other, virtual sell orders are considered equivalent to each other and virtual buy orders are considered equivalent to each other.

The operation of the system of FIG. 26 may further include computing at least one implied order based on at least one of the at least one minimal set (block 2706).

The operation of the system of FIG. 26 may further include representing each of the at least one minimal set as a graph having edges and nodes defined by the order subsets thereof (block 2708).

It will be appreciated that there may be other algorithms presently available or later developed which may be utilized to identify the minimal forms from the set of orders.

The third step in transforming the security definition is create the additional grid points needed to define the helper orders that link the edges in each minimal form. FIG. 14 shows the buy butterfly order 1401 implied by the two spreads 1403 and 1406 that constitute the minimal form of this butterfly. The requirement that all of the spreads be present to form an implied is expressed by the helper orders 1402, 1404, 1405 and 1407. Helper orders, in general, express the relationships between contracts in a combination product. They have zero price, infinitely early time and infinite volume. They have the unique property that all the helper orders associated with a combination must be present in an implied order that contains the combination as a component. The function of the helper orders is to enforce the logical "anding" of trades in all the legs by requiring all the orders to be traversed before an implied is created.

The additional grid points required to represent the new implicable butterfly are determined according to the following procedure. Create one node for the starting node of the new contract's buy order, as previously mentioned. Create one node for the ending node of the buy order, as also previously mentioned. Create one intermediate node for each node on the original grid 1101 where attempting to follow a path through the collection of spreads will require one or more helper orders to reach the next spread in the collection. The helper orders and the intermediate node are said to impose a connection between the spread orders. For the butterfly in FIG. 14, there is one minimal form and this minimal form has one imposed connection from the (4,5) spread to the (6,5) spread, so that only one intermediate node is needed. The total number of grid points (i.e. nodes) needed is three, which in FIG. 14 are numbered 10, 11 and 12. The buy butterfly order 1401 is associated with edge 10-12 in keeping with the convention that buy orders should connect a lower numbered node with a higher numbered node except when one of the nodes is the virtual node 0.

In one embodiment, an intermediate node is created for each spread in a minimal form, less one, so that a minimal form with two spreads will have a buy node, a sell node and one intermediate node.

The fourth step is to create the helper orders required to imply a buy order in the newly defined security. These are drawn in a straightforward manner to connect the starting node of the implied buy through the spreads in the minimal form and the intermediate node to the ending node of the implied buy. The set {(4,5), (6,5)} and the list of nodes {10, 11,12} result in the helper orders {(10,4), (5,11), (11,6), (5,12)}. These helper orders are associated with the implied buy butterfly and are therefore referred to as "buy helpers".

Figure 15:
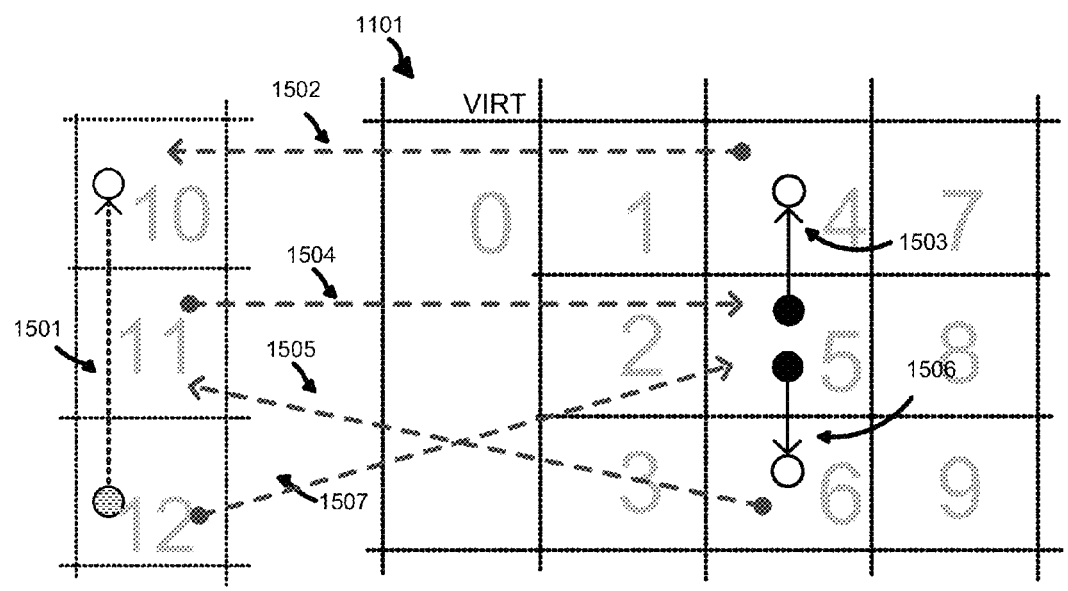
FIG. 15 illustrates the placement of sell helper orders in constructing the nodes and edges representation for a butterfly.

The fifth and final step in expressing the implicable butterfly as a collection of nodes and helper orders is to create "sell helper" orders for the sell butterfly, as illustrated in FIG. 15. These are the exact opposites of the buy helpers, as can be seen by comparing 1502, 1504, 1505 and 1507 with their counterparts 1402, 1404, 1405 and 1407 in FIG. 14. The implied sell butterfly 1501 is created by the path consisting of helper 1507 plus real spread 1506 plus helper 1505 plus helper 1504 plus real spread 1503 plus helper 1502.

In the modeling language, the helper orders are typically shown as "blue helpers," shown as dotted lines in the Figures, for the implied buy and "red helpers," shown as dashed lines in the Figures, for the implied sell, following the common industry practice of associating "buy" with "blue". When the Match Engine 104 creates the nodes and edges required to implement the calculations specified in the modeling language, the edges associated with helper orders are labeled as being either red or blue. In one implementation, the shortest path algorithm eliminates potential branches from the shortest path tree if they would include a red and a blue helper from the same strategy, since a shortest path cannot contain both the buy side of a contract and the sell side of a contract in the same path.

Those of skill in the art will appreciate that other arrangements of helper orders could be used to represent the butterfly. For example, a buy helper from node 5 to node 6 could be used in place of the (5,11) and (11,6) helpers. Alternatively, the butterfly itself could have been defined with only one new node for the buy end of the order and the sell end placed at node 0. It is understood that the general procedure to create nodes and helper edges may be optimized for specific sets of contracts and the anticipated distribution of orders amongst these contracts in a specific electronic trading system.

It should be further understood that helper orders are used to express a "logical and" operation, also referred to as a "logical product" or "Boolean product". This operation is commutative in the sense that "A and B" has the same value as "B and A" and associative in the sense that "A and (B and C)" has the same value as "(A and B) and C". As such, it is possible to express the requirements for implying a strategy in a minimal form with more than one arrangement of helper orders. It is also possible to define helper orders with the property that they be traversed a specific number of times to ensure that all the necessary edges are present to create an implied. The transformation of logical expressions and the translation of these expressions into sequences of helper orders will be apparent to those of skill in the art.

Similarly, the algorithms for constructing shortest path trees, and the related algorithms for finding tradable cycles, can be readily extended to include helper orders. In the simplest extension, the helpers are treated as zero-price, infinite volume, infinitely early orders with no special constraints. When the unconstrained shortest path tree has been calculated, each path is retraced to the root to confirm that it contains either no helper orders or a complete set of helper orders for each strategy that appears in the path. If the arrangement of helper orders makes it possible for a node to be visited more than once in the construction of a valid shortest path, then the tree representation must be extended to allow this. Instead of each node in the tree having a single predecessor as shown in FIG. 8, a node may have a different predecessor for each position it has in the path. This can be easily recorded by adding another dimension to the spt[j] matrix 802, by using edges as predecessors instead of nodes or by "cloning" the object used to represent the node in an object-oriented graph representation as might be used in a programming language such as Java or C++. Although these algorithm extensions increase the amount of data required to represent the tree, those of skill in the art will appreciate that a variety of techniques can be used to prevent the construction of tree branches that have no possibility of being valid or to otherwise increase the efficiency of the calculations. If multiple minimal forms are present, the Match Engine 104 selects the form that gives the best price, time, or other business priority. If the two forms are equal in terms of business priority then the Match Engine 104 can assign a technical priority by form number so that the trades can be calculated in a definable sequence.

The foregoing technique for transforming a FIX security definition request into a set of nodes and helper edges can be applied to strategies of any complexity, including but not limited to the condor, the double butterfly and the crack spread, illustrated in FIG. 16 through FIG. 25. Those of skill in the art will appreciate that a many of the other strategies used in electronic trading have forms that are similar to these basic strategies and can be transformed in similar ways. For example, the "strangle" is like the butterfly, described above, in that the buy is a collection of sells into a common point. The "straddle" and the "Christmas tree" are like the condor, described above, in that the buy is defined as a buy spread and a sell spread with no common endpoints. The Match Engine 104 calculates the complete set of minimal forms for each implicable strategy and creates the nodes and edges required to represent these forms internally.

Figure 16:
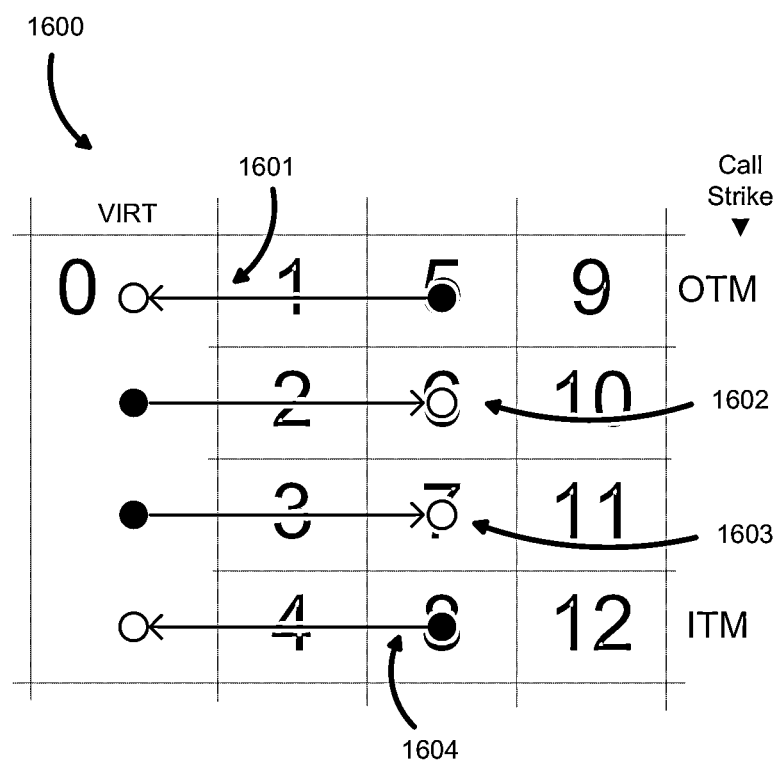
FIG. 16 illustrates the outright legs of a call options condor in maximal form.
Figure 17:
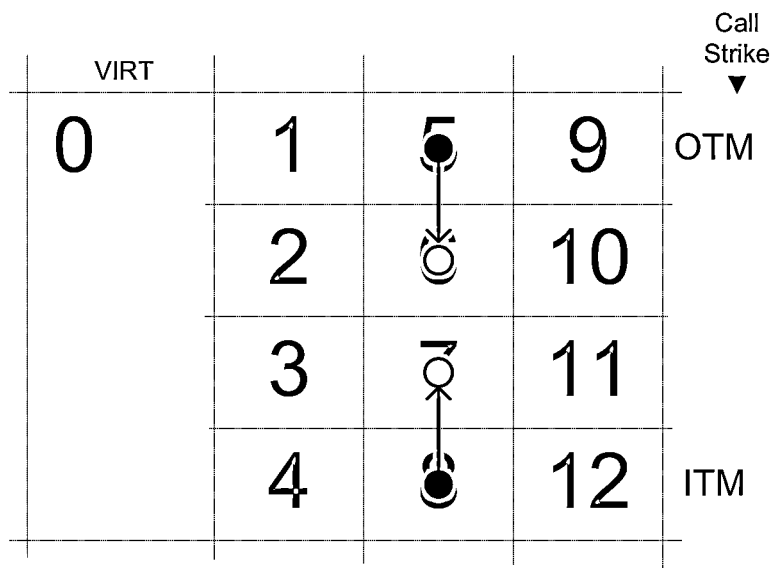
FIG. 17 illustrates one of the two minimal forms associated with the condor of FIG. 16.
Figure 18:
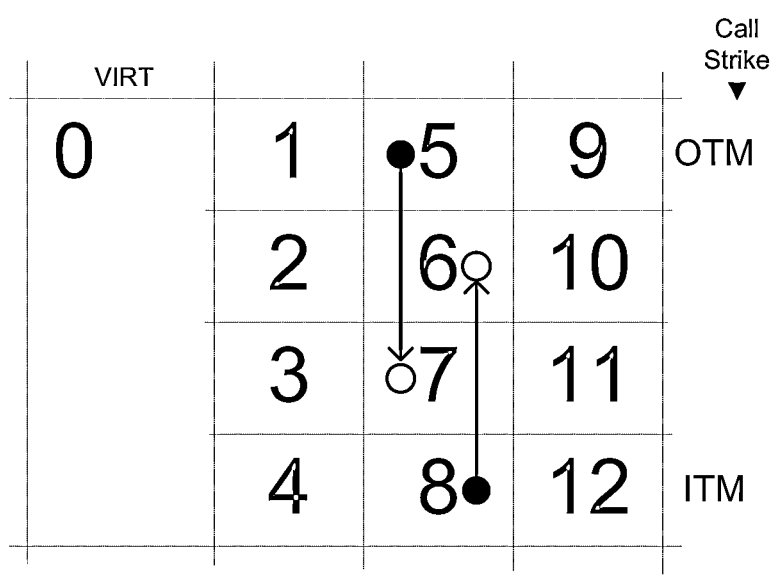
FIG. 18 illustrates the other minimal form associated with the condor of FIG. 16.

An example of the condor strategy is shown in TABLE 5, TABLE 6, FIG. 16, FIG. 17 and FIG. 18. TABLE 5 contains the parent security definition and TABLE 6 contains the component leg definitions. FIG. 16 shows the four legs of the condor from which the minimal forms will be calculated. The contract grid 1600 contains call options for a single product at three delivery periods and four strike prices. Orders 1601, 1602, 1603 and 1604 correspond to the outright legs in TABLE 6.

TABLE 5

SECURITY_DEFINITION_REQUEST

| SecurityID | Symbol | Factor | SecurityDesc | NoLegs | MinPrice Increment | Unit of Measure |
|---|---|---|---|---|---|---|
| 1605 | COX | 1 | Condor Example | 4 | 0.0001 | 10000 mmBtu |

TABLE 6

SECURITY_DEFINITION_REQUEST_COMPONENT

| SecurityID | LegSecurityID | LegRatioQty | LegSide (1 = BUY, 2 = SELL) |
|---|---|---|---|
| 1605 | 1601 | 1 | 1 |
| 1605 | 1602 | 1 | 2 |
| 1605 | 1603 | 1 | 2 |
| 1605 | 1604 | 1 | 1 |

Figure 19:
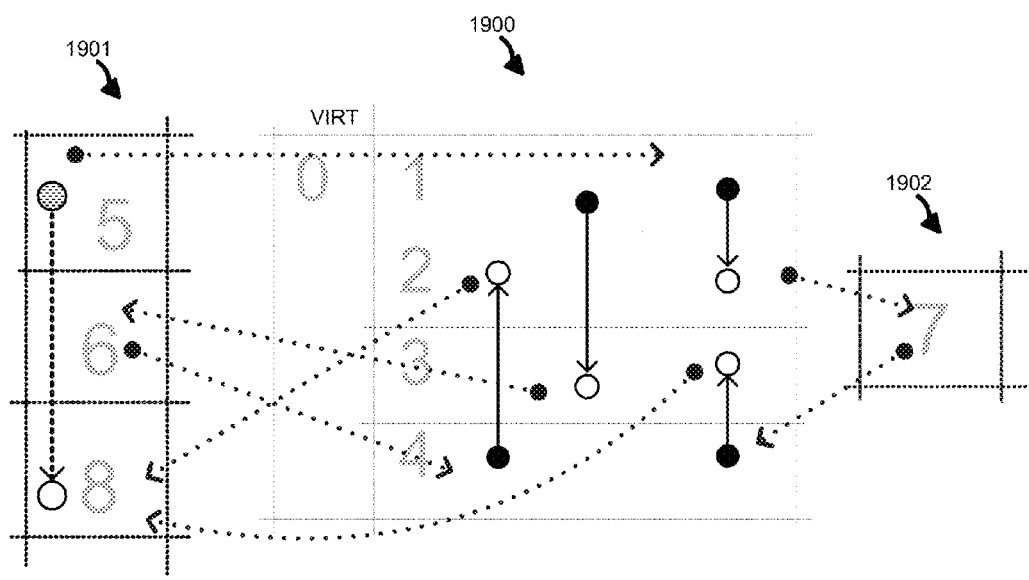
FIG. 19 illustrates the arrangement of nodes and helper orders used to represent the condor in its two minimal forms, with only the buy helpers shown.
Figure 20:
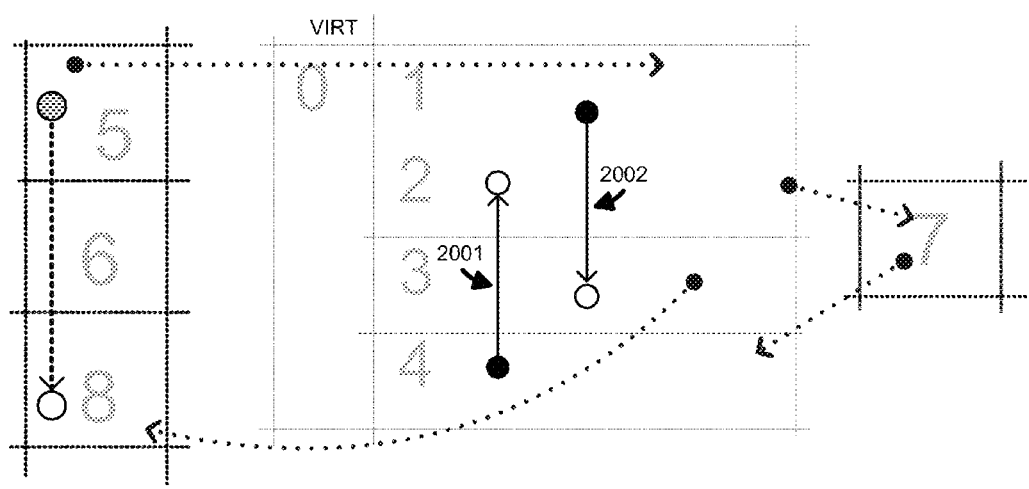
FIG. 20 illustrates the insufficiency of a single minimal form to represent the condor.

FIG. 17 and FIG. 18 show the two minimal forms possible with the condor. FIG. 19 shows the additional nodes and helper orders created to represent the two forms. The main grid 1900 has been simplified to show only a single delivery period. The two minimal forms share the same start and end point but require different intermediate points. The minimal form shown in FIG. 17 is represented by the sequence {(5,1), (1,2), (2,7), (7,4), (4,3), (3,8)} in FIG. 19, which passes through the intermediate node 7 shown in additional grid 1902. The minimal form shown in FIG. 18 is represented by the sequence {(5,1), (1,3), (3,6), (6,4), (4,2), (2,8)} in FIG. 19, which passes through the intermediate node 6 shown in additional grid 1901. For simplicity only the buy helpers have been shown. The requirement that both forms be present can be seen by removing the helpers for one of the forms and the resting real orders for the other, as has been done in FIG. 20. The resting spreads 2001 and 2002 imply the buy condor in the business sense but there is no path that can be traced from node 5 to node 8.

Figure 21:
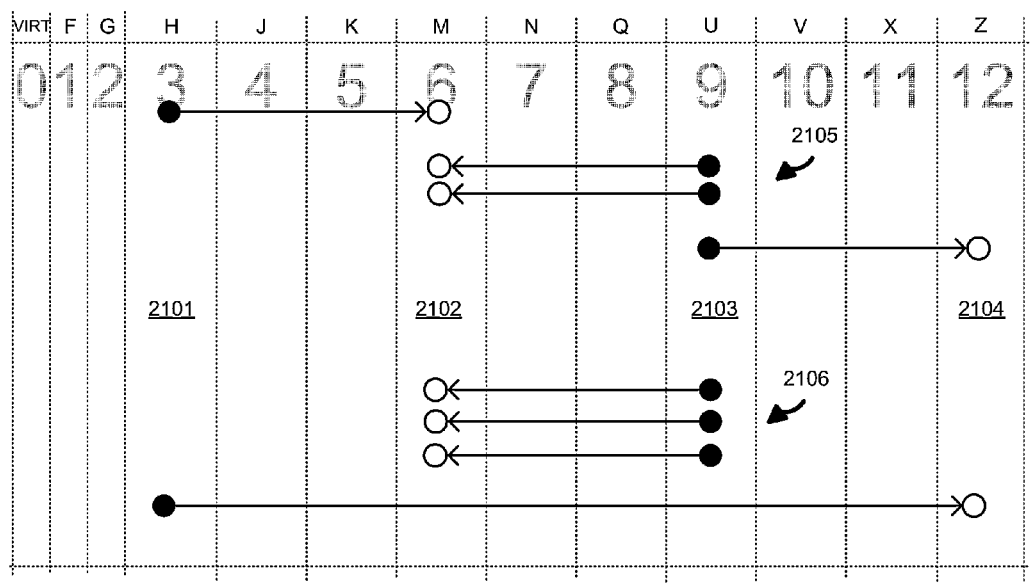
FIG. 21 illustrates two minimal forms associated with the double butterfly.
Figure 22:
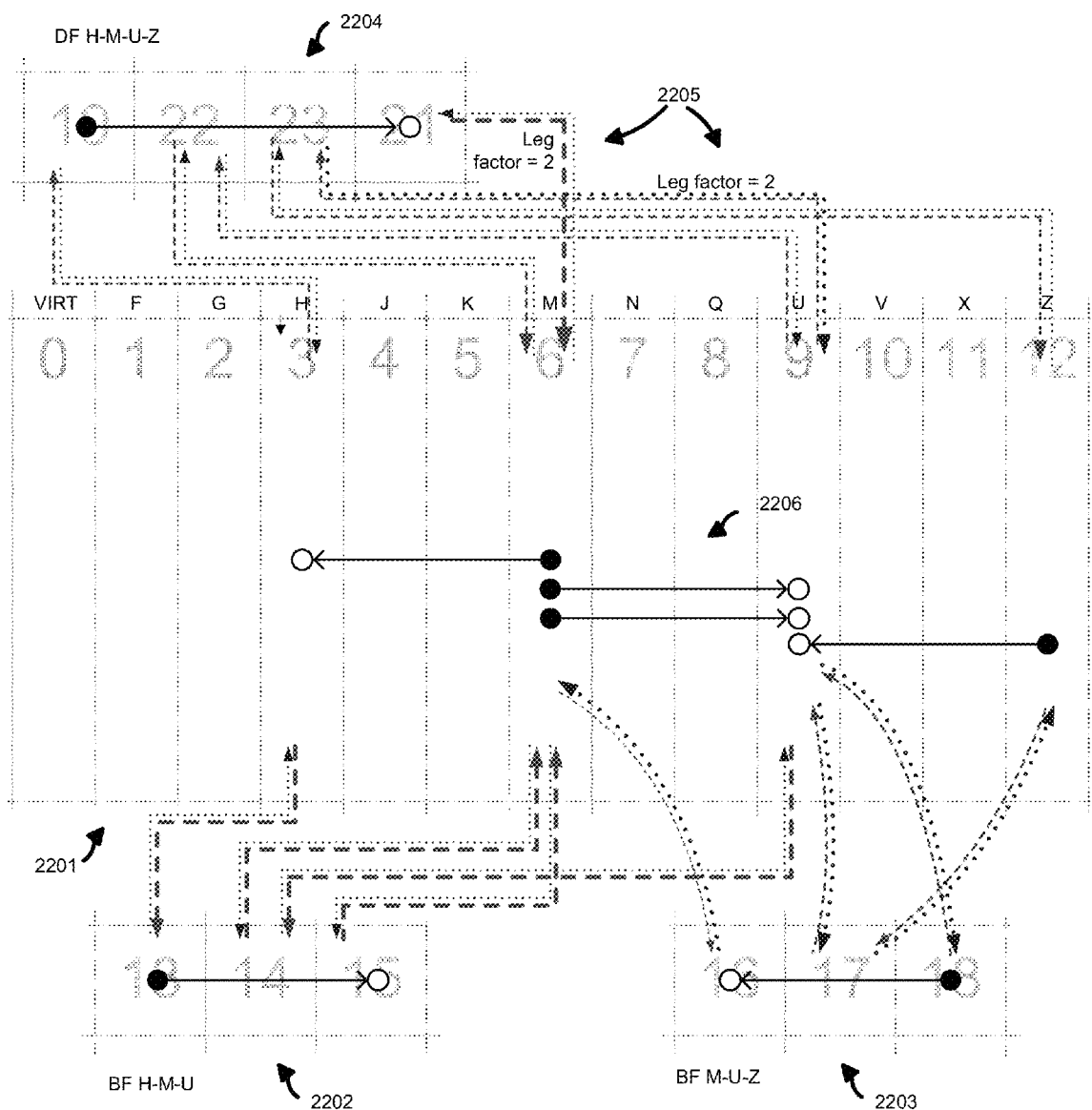
FIG. 22 illustrates the double butterfly in a tradable combination with two simple butterflies.
Figure 23:
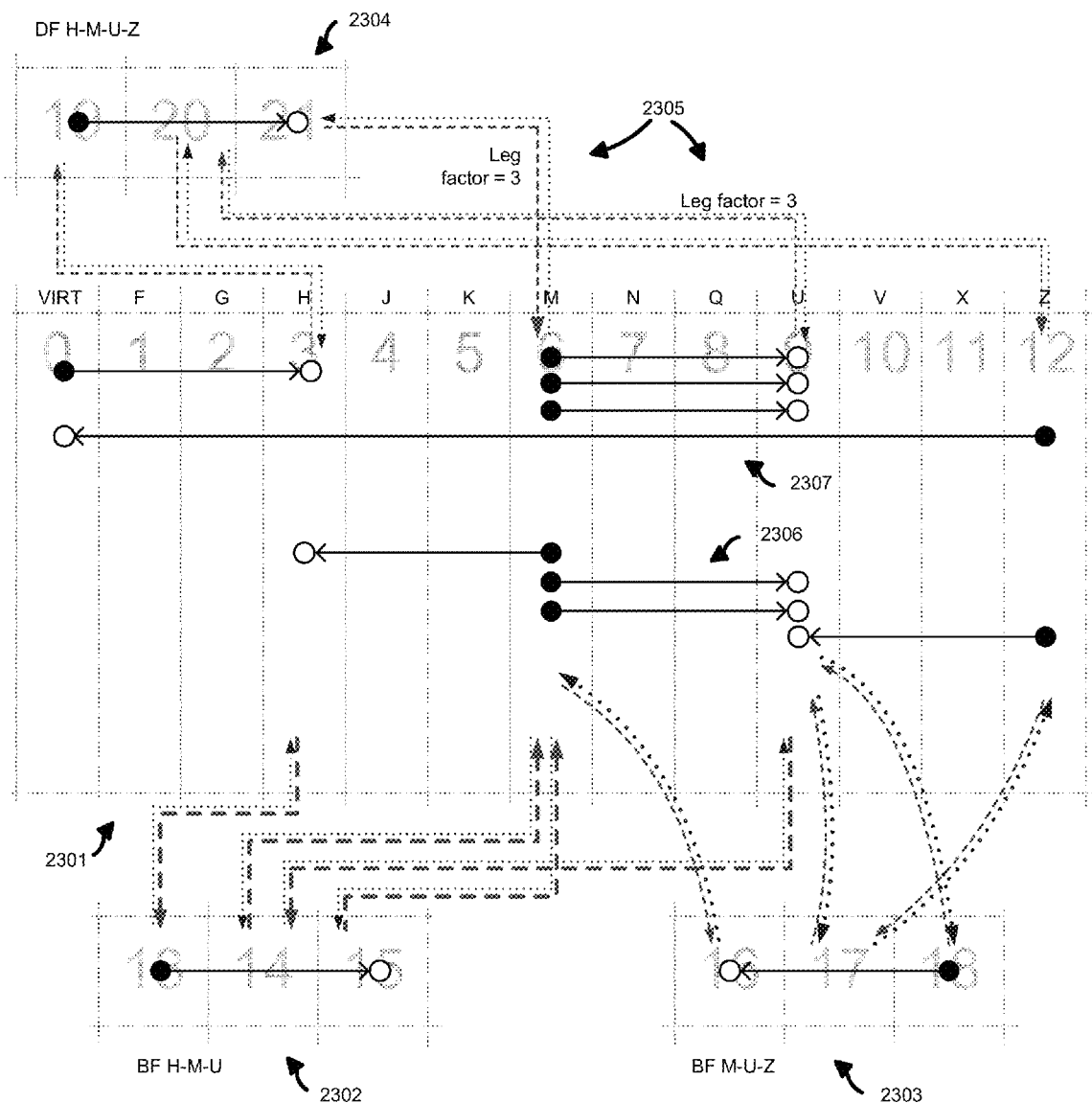
FIG. 23 illustrates a tradable combination that can be formed with the double butterfly.

An example of the double butterfly for futures is shown in TABLE 7, TABLE 8, FIG. 21, FIG. 22 and FIG. 23. The double butterfly is equivalent to a spread of simple butterflies with overlapping wings and in an implementation this is expressed as set of legs, for example "Buy1exp1 Sell3exp2 Buy3exp3 Sell1 exp4". The equivalent FIX security definition is given in TABLE 7 and TABLE 8. TABLE 7 contains the parent security definition and TABLE 8 contains the component leg definitions.

FIG. 21 shows the two minimal forms of the double butterfly. The upper form 2105 consists of three spreads, one of which has a volume of two. The lower form 2106 consists of two spreads, one of which has a volume of three. The LegSecurityID values in the TABLE 8 correspond to the solid (buy) and open (sell) circles that form the starting and ending points of the spreads in the two forms. For example, the first leg 2101 corresponds to the selling of 1 lot in the March (H) delivery period.

TABLE 7

SECURITY_DEFINITION_REQUEST

| SecurityID | Symbol | Factor | SecurityDesc | NoLegs | MinPrice Increment | Unit of Measure |
|---|---|---|---|---|---|---|
| 9999 | DFX | 1 | Double Butterfly Example | 4 | 0.0001 | 10000 mmBtu |

TABLE 8

SECURITY_DEFINITION_REQUEST_COMPONENT

| SecurityID | LegSecurityID | LegRatioQty | LegSide (1 = BUY, 2 = SELL) |
|---|---|---|---|
| 9999 | 2101 | 1 | 1 |
| 9999 | 2102 | 3 | 2 |
| 9999 | 2103 | 3 | 1 |
| 9999 | 2104 | 1 | 2 |

FIG. 22 and FIG. 23 show the representations of the butterfly in a separate diagram for each of its minimal forms, so that their use in tradable combinations can be more clearly illustrated. In FIG. 22, the initial contract grid 2201 for outright orders and spread orders is the same as in FIG. 21. Nodes 13, 14 and 15 have been added to represent the March-June-September butterfly 2202, referred to symbolically as "BF H-M-U". Nodes 16, 17 and 18 have been added to represent the June-September-December butterfly 2203, referred to symbolically as "BF M-U-Z". Nodes 19, 22, 23 and 21 have been added to represent the minimal form associated with 2105 in FIG. 21, shown here as double butterfly 2204, represented symbolically as "DF H-M-U-Z". Helper orders 2205 from node 21 to node 6 and from node 23 to node 9 are shown with the decoration "Leg factor=2" to indicate that the spreads encountered at the ends of these helpers must be present in two lots in order for one lot of the strategy to be implied. As previously discussed, this is used as a weighting factor in calculating the implied volume associated with a path that includes this particular helper order.

The resting spread orders 2206 are the opposites of those shown in form 2105 in FIG. 5. As such, they imply a sell double butterfly order that can trade with the real buy double butterfly 2204. The tradable cycle consists of the nodes {19, 21, 6, 9, 23, 12, 9, 22, 6, 3, 19}. It is also possible for the resting spreads to trade with the buy butterfly 2202 and the real sell butterfly 2203. The tradable cycle in this case consists of the nodes {13, 15, 6, 9, 18, 16, 6, 9, 17, 12, 9, 14, 6, 3, 13}.

In FIG. 23, the initial contract grid 2301 for outright orders and spread orders is the same as in FIG. 21. As in FIG. 22, nodes 13, 14 and 15 have been added to represent the March-June-September butterfly 2302 and nodes 16, 17 and 18 have been added to represent the June-September-December butterfly 2303. In contrast, the minimal form associated with 2106 in FIG. 21 is shown here as double butterfly 2304 with the nodes 19, 20 and 21. It is understood that both minimal forms must be represented in the match engine and the nodes 19 and 21 as the endpoints for the real strategy orders are common to both forms. Helper orders 2305 from node 21 to node 6 and from node 20 to node 9 are shown with the decoration "Leg factor=3" to indicate that the spreads encountered at the ends of these helpers must be present with a volume of three lots for every lot of the strategy to be implied.

It should be noted that the helper orders connecting node 21 with node 6 are different for the two minimal forms, so there is now the possibility of having more than one edge between two nodes. However, this does not pose a problem for the shortest paths algorithm because multiple edges are only possible with helper orders. It is possible to include more than one minimal form in the same implied if the strategy order is required at more than one position in a tradable cycle. However, one can impose the condition that minimal forms not be overlapped during the search, based on the principle that the logical "anding" represented by the helper orders is both commutative and associative, so that any combination possible with overlapped forms will also be possible with sequential forms. Thus, a branch of the search tree that begins with a helper from one minimal form can exclude helpers from other minimal forms in the same strategy until the helpers from the active form have been completely traversed. These and other techniques may be used to take advantage of graph theory algorithms that normally allow only a single edge between each pair of nodes.

In FIG. 23, the resting spread orders 2306 are the opposites of those shown in form 2105 in FIG. 5 and imply a sell double butterfly order. The resting spread orders 2307 are the opposites of those shown in form 2106 in FIG. 21 and also imply a sell double butterfly order. The minimal form represented in FIG. 23 can form a tradable combination with resting spread orders 2307 but not resting spread orders 2306, since there is not sufficient volume in the M-U spread (node 6 to node 9) to satisfy the three lots required by the volume factors on helpers 2305. The tradable cycle with resting spreads 2307 consists of the nodes {19, 21, 6, 9, 20, 12, 0, 3, 19}. Note that both sets of orders 2306 and 2307 can form a tradable combination with the buy butterfly 2302 and the real sell butterfly 2303. The tradable cycle for 2306 consists of the nodes {13, 15, 6, 9, 18, 16, 6, 9, 17, 12, 9, 14, 6, 3, 13}, exactly as it did in FIG. 22. The tradable cycle for 2307 consists of the nodes {13, 15, 6, 9, 14, 6, 9, 18, 16, 6, 9, 17, 12, 0, 3, 13}. The subsequence {6,9} appears twice in the path associated with 2306 and three times in the path associated with 2307.

Figure 24:
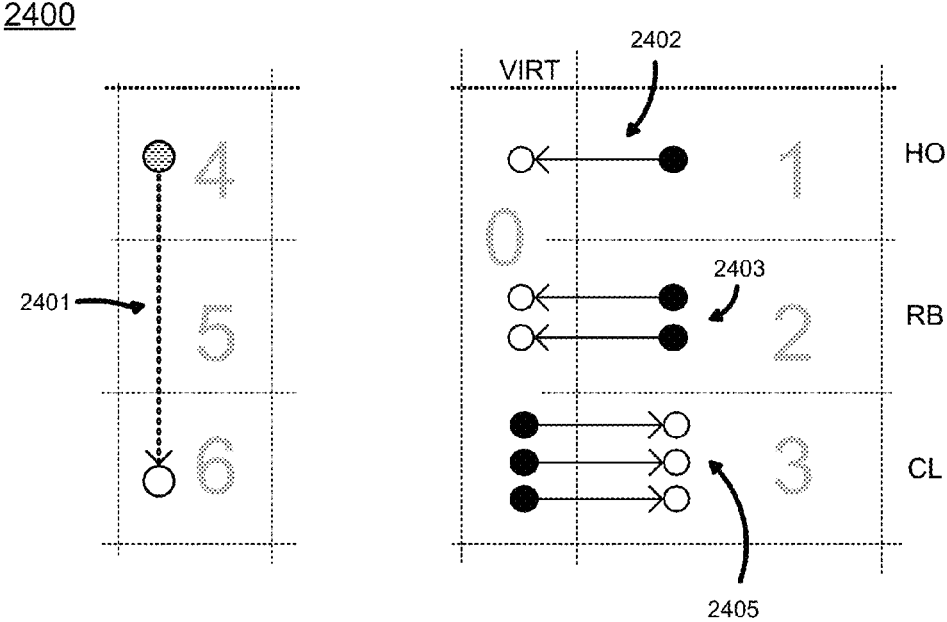
FIG. 24 illustrates the 3:2:1 crack spread in maximal form.
Figure 25:
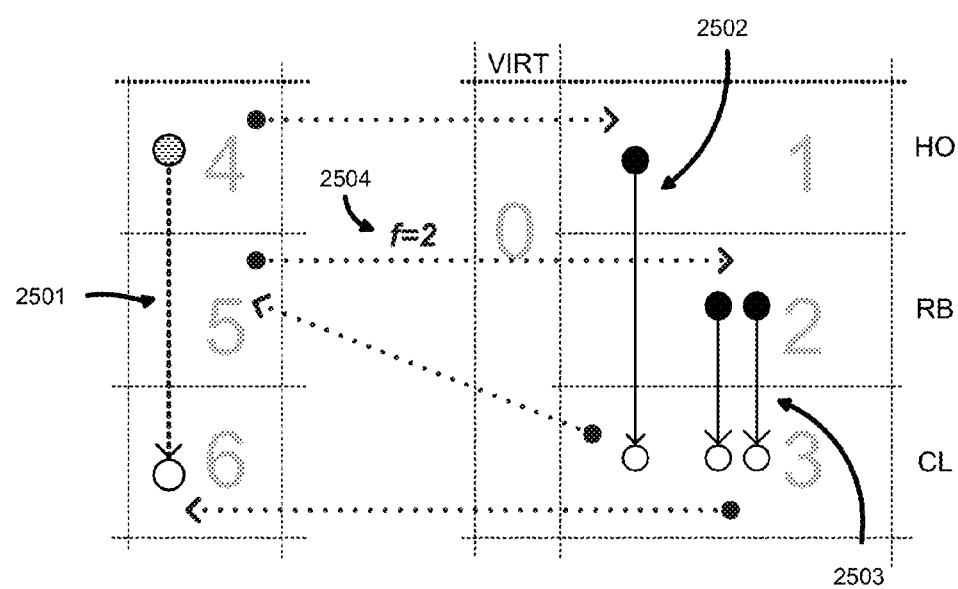
FIG. 25 illustrates the 3:2:1 crack spread in its nodes and edges form with the buy helpers shown.

An example of the 3:2:1 crack spread for crude oil, gasoline and heating oil futures is shown in TABLE 9, TABLE 10, FIG. 24 and FIG. 25. TABLE 9 contains the parent security definition and TABLE 10 contains the component leg definitions. The legs from TABLE 10 are shown in FIG. 24 as orders 2402, 2403 and 2404, following the convention of previous examples that multiple unit volume edges are shown in place of a single edge with a non-unitary volume. FIG. 25 shows the single minimal form for the 3:2:1 crack, where HO:CL spread 2502 and RB:CL spread 2503 have replaced the outright legs. Only the buy helpers are shown, on the understanding that the sell helpers will be their exact opposites. The arrangement of spreads is similar to that of the simple butterfly except that the helper order 2504 from node 5 to node 2 has a volume factor "f=2". This indicates to the match engine 104 that two lots are required in the next spread in order to imply one lot of the 3:2:1 crack spread.

TABLE 9

SECURITY_DEFINITION_REQUEST

| SecurityID | Symbol | Factor | SecurityDesc | NoLegs | MinPrice Increment | Unit of Measure |
|---|---|---|---|---|---|---|
| 2401 | KRAK | 1 | 3:2:1 Crack Spread Example | 3 | 0.01 | 1000 BBL |

TABLE 10

SECURITY_DEFINITION_REQUEST_COMPONENT

| SecurityID | LegSecurityID | LegRatioQty | LegSide (1 = BUY, 2 = SELL) |
|---|---|---|---|
| 2401 | 2402 | 1 | 1 |
| 2401 | 2403 | 2 | 1 |
| 2401 | 2404 | 3 | 2 |

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method of generating an implied order, the method comprising:
   receiving, by a processor, an order to buy and an order to sell, each being for an associated quantity of an item of a plurality of items tradeable on an exchange, wherein the associated quantity of the order to buy may be different from the associated quantity of the order to sell;
   converting, by the processor, the order to buy and the order to sell into a unit order set comprising a separate buy order for each of the associated quantity of the order to buy and a separate sell order for each of the associated quantity of the order to sell;
   identifying, by the processor, at least one minimal set comprising a unique subset of the unit order set; and
   computing, by the processor, based on the at least one minimal set, the implied order comprising at least two orders of the unit order set characterized by a 1:1 volume ratio.

2. The computer implemented method of claim 1 wherein the converting further comprises:
   for each buy order for a quantity of more than one unit, converting, by the processor, the buy order into a separate buy order for each unit of the quantity, the unit order set comprising any remaining buy orders which are for a quantity of only one unit and the separate buy orders; and
   for each sell order for a quantity of more than one unit, converting, by the processor, the sell order into a separate sell order for each unit of the quantity, the unit order set further comprising any remaining sell orders which are for a quantity of only one unit and the separate sell orders.

3. The computer implemented method of claim 1 wherein the identifying further comprises:
   ordering, by the processor, the sell orders of the unit order set in a first sequence;
   selecting, by the processor one at a time, each of the buy orders of the buy orders in the unit order set, ordering the buy orders of the unit order set in a second sequence beginning with the selected buy order, and, for one of the at least one minimal set for which subsets of the unit order set have not yet been generated, generating, by the processor for each buy order in order of the second sequence for which a subset of the unit order set of the one of the at least one minimal set does not already include a pairing thereof, a subset of the unit order set comprising a pairing of the buy order with an unpaired sell order in order of the first sequence, and wherein for each remaining unpaired buy order, generating a subset of the unit order set comprising a pairing thereof with a virtual sell order and for each remaining unpaired sell order, generating, by the processor, subset of the unit order set comprising a pairing thereof with a virtual buy order; and
   comparing, by the processor, each of the at least one minimal sets to another of the at least one minimal set and removing the other of the at least one minimal set if the other of the at least one minimal set is substantially equivalent thereto, each of the remaining at least one minimal set being unique.

4. The computer implemented method of claim 3 wherein, for the purpose of determining equivalence among minimal order sets, separate buy orders converted from the one buy order are considered equivalent to each other, separate sell orders converted from the sell order are considered equivalent to each other, virtual sell orders are considered equivalent to each other and virtual buy orders are considered equivalent to each other.

5. The computer implemented method of claim 1 wherein each subset of the unit order set comprises a spread.

6. The computer implemented method of claim 1 wherein the tradeable item comprises a futures contract, an order to buy a futures contract, an order to sell a futures contract, a combination contract, or a combination thereof.

7. The computer implemented method of claim 1 wherein the buy and sell orders comprises a strategy, each of the buy order and sell order comprising a leg of the strategy.

8. The computer implemented method of claim 7 wherein the strategy comprises one of a butterfly or condor.

9. The computer implemented method of claim 1 wherein the buy and sell orders comprise a combination contract.

10. The computer implemented method of claim 1 wherein the set of orders is specified using the FIX protocol.

11. The computer implemented method of claim 1 wherein the tradeable item is characterized by a price, a quantity, a delivery month or combinations thereof.

12. The computer implemented method of claim 1 wherein the buy and sell orders comprises a maximal form.

13. The computer implemented method of claim 1 further comprising representing each of the at least one minimal set as a graph having edges and nodes defined by the subset of the unit order set thereof.

14. A system for generating an implied order, the system comprising a processor and a memory coupled therewith, the system further comprising:
    an order receiver computer program stored in the memory and executable by the processor to cause the processor to receive an order to buy and an order to sell, each being for an associated quantity of an item of a plurality of items tradeable on an exchange, wherein the associated quantity of the order to buy may be different from the associated quantity of the order to sell;
    a unit order set converter computer program stored in the memory and coupled with the order receiver computer program and executable by the processor to cause the processor to convert the order to buy and the order to sell into a unit order set comprising a separate buy order for each unit of the associated quantity of the order to buy and a separate sell order for each unit of the associated quantity of the order to sell;
    a minimal set identifier computer program stored in the memory and coupled with the unit order set converter computer program and executable by the processor to cause the processor to identify at least one minimal set comprising a unique subset of the unit order set; and
    an implied order generator computer program stored in the memory and coupled with the minimal set identifier computer program and executable by the processor to cause the processor to compute, based on the at least one minimal set, each of the at least one implied order comprising at least two orders of the unit order set characterized by a 1:1 volume ratio.

15. The system of claim 14 wherein the unit order set converter computer program further comprises:
    a conversion processor computer program stored in the memory and executable by the processor to cause the processor, for each buy order for a quantity of more than one unit, to convert the buy order into a separate buy order for each unit of the quantity, the unit order set comprising the remaining of the buy orders for a quantity of only one unit and the separate buy orders; and
    the conversion processor computer program being further executable by the processor to cause the processor to, for each sell order for a quantity of more than one unit, to convert the sell order into a separate sell order for each unit of the quantity, the unit order set further comprising the remaining of the sell orders of the set of orders for a quantity of only one unit and the separate sell orders.

16. The system of claim 14 wherein the minimal set identifier computer program further comprises:
    an order sequencer computer program stored in the memory and executable by the processor to cause the processor to order the sell orders of the unit order set in a first sequence;
    an order selector computer program stored in the memory and coupled with the order sequencer computer program and executable by the processor to cause the processor to select, one at a time, each of the buy orders of the buy orders in the unit order set, order the buy orders of the unit order set in a second sequence beginning with the selected buy order, and, for one of the at least one minimal set for which subsets of the unit order set have not yet been generated, generate, for each buy order in order of the second sequence for which a subset of the unit order set of the one of the at least one minimal set does not already include a pairing thereof, a subset of the unit order set comprising a pairing of the buy order with an unpaired sell order in order of the first sequence, and wherein for each remaining unpaired buy order, generate a subset of the unit order set comprising a pairing thereof with a virtual sell order and for each remaining unpaired sell order, generate a subset of the unit order set comprising a pairing thereof with a virtual buy order; and
    a minimal set comparator computer program stored in the memory and coupled with the order selector computer program and executable by the processor to cause the processor to compare each of the at least one minimal sets to another of the at least one minimal set and remove the other of the at least one minimal set if the other of the at least one minimal set is substantially equivalent thereto, each of the remaining at least one minimal set being unique.

17. The system of claim 16 wherein, for the purpose of determining equivalence among minimal order sets, separate buy orders converted from the buy order are considered equivalent to each other, separate sell orders converted from the sell order are considered equivalent to each other, virtual sell orders are considered equivalent to each other and virtual buy orders are considered equivalent to each other.

18. The system of claim 14 wherein each subset of the unit order set comprises a spread.

19. The system of claim 14 wherein the tradeable item comprises a futures contract, an order to buy a futures contract, an order to sell a futures contract, a combination contract, or a combination thereof.

20. The system of claim 14 wherein the set of orders comprises a strategy, each buy order and sell order comprising a leg of the strategy.

21. The system of claim 20 wherein the strategy comprises one of a butterfly or condor.

22. The system of claim 14 wherein the set of orders comprises a combination contract.

23. The system of claim 14 wherein the set of orders is specified using the FIX protocol.

24. The system of claim 14 wherein the tradeable item is characterized by a price, a quantity, a delivery month or combinations thereof.

25. The system of claim 14 wherein the set of orders comprises a maximal form.

26. The system of claim 14 further comprising a display coupled with the processor and operative to represent each of the at least one minimal set as a graph having edges and nodes defined by the order subsets thereof.

27. A system for generating an implied order, the system comprising:
   means for receiving an order to buy and an order to sell, each being for an associated quantity of one or more units of an item of a plurality of items tradeable on an exchange, wherein the associated quantity of one order may be different from the associated quantity of another order;
   means for converting the buy and sell orders into a unit order set comprising a separate buy order for each unit of the associated quantity of the buy order and a separate sell order for each unit of the associated quantity of the sell order;
   means for identifying at least one minimal set comprising a unique subset of the unit order set; and
   means for generating at least one implied order based on the at least one minimal set, each of the at least one implied order comprising at least two orders of the unit order set characterized by a 1:1 volume ratio.

28. The system of claim 27 wherein the means for converting further comprises:
   for each buy order for a quantity of more than one unit, means for converting the buy order into a separate buy order for each unit of the quantity, the unit order set comprising any remaining buy orders which are for a quantity of only one unit and the separate buy orders; and
   for each sell order for a quantity of more than one unit, means for converting the sell order into a separate sell order for each unit of the quantity, the unit order set further comprising any remaining sell orders which are for a quantity of only one unit and the separate sell orders.

29. The system of claim 27 wherein the means for identifying further comprises:
   means for ordering the sell orders of the unit order set in a first sequence;
   means for selecting, one at a time, each of the buy orders of the buy orders in the unit order set, ordering the buy orders of the unit order set in a second sequence beginning with the selected buy order, and, for one of the at least one minimal set for which subsets of the unit order set have not yet been generated, generating, by the processor for each buy order in order of the second sequence for which a subset of the unit order set of the one of the at least one minimal set does not already include a pairing thereof, a subset of the unit order set comprising a pairing of the buy order with an unpaired sell order in order of the first sequence, and wherein for each remaining unpaired buy order, generating a subset of the unit order set comprising a pairing thereof with a virtual sell order and for each remaining unpaired sell order, generating, by the processor, subset of the unit order set comprising a pairing thereof with a virtual buy order; and
   means for comparing each of the at least one minimal sets to another of the at least one minimal set and removing the other of the at least one minimal set if the other of the at least one minimal set is substantially equivalent thereto, each of the remaining at least one minimal set being unique.

* * * * *